US008234652B2

(12) United States Patent
Arimilli et al.

(10) Patent No.: US 8,234,652 B2
(45) Date of Patent: *Jul. 31, 2012

(54) PERFORMING SETUP OPERATIONS FOR RECEIVING DIFFERENT AMOUNTS OF DATA WHILE PROCESSORS ARE PERFORMING MESSAGE PASSING INTERFACE TASKS

(75) Inventors: Lakshminarayana B. Arimilli, Austin, TX (US); Ravi K. Arimilli, Austin, TX (US); Ramakrishnan Rajamony, Austin, TX (US); William E. Speight, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

This patent is subject to a terminal disclaimer.

(21) Appl. No.: 11/846,154

(22) Filed: Aug. 28, 2007

(65) Prior Publication Data

US 2009/0064167 A1    Mar. 5, 2009

(51) Int. Cl.
   *G06F 9/46* (2006.01)
   *G06F 15/173* (2006.01)
(52) U.S. Cl. .......................... 718/105; 718/104; 709/226
(58) Field of Classification Search ................... 718/105
   See application file for complete search history.

(56) References Cited

U.S. PATENT DOCUMENTS

| | | | |
|---|---|---|---|
| 5,222,229 A | 6/1993 | Fukuda et al. | |
| 5,241,677 A | 8/1993 | Naganuma et al. | |
| 5,384,906 A | 1/1995 | Horst | |
| 5,694,602 A | 12/1997 | Smith | |
| 5,752,030 A * | 5/1998 | Konno et al. | 718/102 |
| 5,845,060 A | 12/1998 | Vrba et al. | |
| 6,078,930 A | 6/2000 | Lee et al. | |
| 6,106,575 A | 8/2000 | Hardwick | |
| 6,230,151 B1 | 5/2001 | Agrawal et al. | |
| 6,292,822 B1 | 9/2001 | Hardwick | |

(Continued)

FOREIGN PATENT DOCUMENTS

EP    1022658 A1    7/2000

(Continued)

OTHER PUBLICATIONS

Plimpton et al., "A Load-Balancing Algorithm for a Parallel Electromagnetic Particle-in-Cell Code", PPPS-2001, Pulsed Power Plama Scient 2001, pp. 1-20.

(Continued)

*Primary Examiner* — Jennifer To
(74) *Attorney, Agent, or Firm* — Stephen J. Walder, Jr.; Diana R. Gerhardt

(57) ABSTRACT

Mechanisms are provided for performing setup operations for receiving a different amount of data while processors are performing message passing interface (MPI) tasks. Mechanisms for adjusting the balance of processing workloads of the processors are provided so us to minimize wait periods for waiting for all of the processors to call a synchronization operation. An MPI load balancing controller maintains a history that provides a profile of the tasks with regard to their calls to synchronization operations. From this information, it can be determined which processors should have their processing loads lightened and which processors are able to handle additional processing loads without significantly negatively affecting the overall operation of the parallel execution system. As a result, setup operations may be performed while processors are performing MPI tasks to prepare for receiving different sized portions of data in a subsequent computation cycle based on the history.

17 Claims, 10 Drawing Sheets

U.S. PATENT DOCUMENTS

| | | | |
|---|---|---|---|
| 6,496,823 | B2 | 12/2002 | Blank et al. |
| 6,535,505 | B1 | 3/2003 | Hwang et al. |
| 6,539,542 | B1 | 3/2003 | Cousins et al. |
| 6,658,449 | B1* | 12/2003 | Brenner et al. ............ 718/105 |
| 7,039,638 | B2 | 5/2006 | Zhang et al. |
| 7,075,541 | B2* | 7/2006 | Diard .......................... 345/505 |
| 7,174,381 | B2 | 2/2007 | Gulko et al. |
| 7,444,637 | B2* | 10/2008 | Pronovost et al. ........... 718/104 |
| 7,464,379 | B2 | 12/2008 | Kanai et al. |
| 8,108,876 | B2 | 1/2012 | Arimilli et al. |
| 8,127,300 | B2 | 2/2012 | Arimilli et al. |
| 2001/0034752 | A1 | 10/2001 | Kremien |
| 2002/0023069 | A1 | 2/2002 | Blank et al. |
| 2002/0194159 | A1 | 12/2002 | Kamath et al. |
| 2003/0018637 | A1 | 1/2003 | Zhang et al. |
| 2003/0078955 | A1 | 4/2003 | Ditlow et al. |
| 2003/0135621 | A1 | 7/2003 | Romagnoli |
| 2004/0015978 | A1 | 1/2004 | Orii |
| 2004/0088708 | A1 | 5/2004 | Ramanujam et al. |
| 2004/0098447 | A1 | 5/2004 | Verbeke et al. |
| 2004/0103218 | A1 | 5/2004 | Blumrich et al. |
| 2004/0133691 | A1 | 7/2004 | Shimada |
| 2004/0162952 | A1 | 8/2004 | Feind et al. |
| 2004/0186920 | A1 | 9/2004 | Birdwell et al. |
| 2005/0102677 | A1 | 5/2005 | Gootherts |
| 2005/0198200 | A1 | 9/2005 | Subramanian et al. |
| 2006/0101104 | A1 | 5/2006 | Bhanot et al. |
| 2006/0155862 | A1 | 7/2006 | Kathi et al. |
| 2006/0156284 | A1 | 7/2006 | Srinivasan |
| 2006/0221087 | A1 | 10/2006 | Diard |
| 2006/0259799 | A1 | 11/2006 | Melpignano et al. |
| 2007/0067606 | A1 | 3/2007 | Lin et al. |
| 2007/0157206 | A1 | 7/2007 | Rakvic et al. |
| 2007/0185996 | A1 | 8/2007 | Bivens et al. |
| 2007/0198986 | A1 | 8/2007 | Panziera |
| 2007/0226686 | A1 | 9/2007 | Beardslee et al. |
| 2007/0233843 | A1 | 10/2007 | Frey-Ganzel et al. |
| 2008/0184214 | A1 | 7/2008 | Archer et al. |
| 2008/0288957 | A1 | 11/2008 | Cascaval et al. |
| 2008/0295108 | A1 | 11/2008 | Ogasawara et al. |
| 2009/0063880 | A1 | 3/2009 | Arimilli et al. |
| 2009/0063885 | A1 | 3/2009 | Arimilli et al. |
| 2009/0064165 | A1 | 3/2009 | Arimilli et al. |
| 2009/0064166 | A1 | 3/2009 | Arimilli et al. |
| 2009/0064168 | A1 | 3/2009 | Arimilli et al. |
| 2010/0115535 | A1* | 5/2010 | Kamii et al. ................... 719/327 |
| 2010/0161911 | A1* | 6/2010 | Li et al. .......................... 711/147 |

FOREIGN PATENT DOCUMENTS

EP          1253516 A2    10/2002

OTHER PUBLICATIONS

A.C. Sodan, "Towards asynchronous metacomputing in MPI", Proceedings of the 16th Annual International Symposium on High Performance Computing Systems and Applications, 2002, p. 21.

U.S. Appl. No. 11/846,101, filed Aug. 28, 2007, Arimilli et al.
U.S. Appl. No. 11/846,119, filed Aug. 28, 2007, Arimilli et al.
U.S. Appl. No. 11/846,141, filed Aug. 28, 2007, Arimilli et al.
U.S. Appl. No. 11/846,168, filed Aug. 28, 2007, Arimilli et al.
USPTO U.S. Appl. No. 11/846,101.
USPTO U.S. Appl. No. 11/846,119.
USPTO U.S. Appl. No. 11/846,141.
USPTO U.S. Appl. No. 11/846,168.
El Maghraoui, Kaoutar "Adaptive Computation over Dynamic and Heterogeneous Networks", Proc. 5th International Conference on Parallel and Applied Mathematics, Sep. 2003, LNCS, vol. 3019, Springer Verlag, pp. 1083-1090.
Kamada, Tomio "Efficient Parallel Global Garbage Collection on Massively Parallel Computers", IEEE, 1994, pp. 79-88.
Li, Jian "The Thrifty Barrier: Energy-Aware Synchronization in Shared-Memory Multiprocessors", International Symposium on High-Performance Computer Architecture (HPCA), Madrid, Spain, Feb. 2004, 11 pages 2004, 10 pages.
Utrera, Gladys "Dynamic Load Balancing in MPI Jobs", ISHPC 2005, pp. 117-129.
Utrera, Gladys "Implementing Malleability on MPI Jobs", PACT 2004, 11 pages.
Xu, Jian "Heuristic Methods for Dynamic Load Balancing in a Message-Passing Supercomputer", IEEE1990, pp. 888-897.
Response to Office Action filed with the USPTO on Jun. 7, 2011 for U.S. Appl. No. 11/846,168, 29 pages.
Response to Office Action filed with the USPTO on Jul. 11, 2011 for U.S. Appl. No. 11/846,101, 35 pages.
Response to Office Action filed with the USPTO on Jul. 11, 2011 for U.S. Appl. No. 11/846,119, 33 pages.
Response to Office Action filed with the USPTO on Aug. 5, 2011 for U.S. Appl. No. 11/846,141, 29 pages.
Final Office Action mailed Sep. 7, 2011 for U.S. Appl. No. 11/846,168, 16 pages.
Final Office Action mailed Oct. 28, 2011 for U.S. Appl. No. 11/846,141, 29 pages.
Interview Summary mailed Nov. 28, 2011 for U.S. Appl. No. 11/846,168, 3 pages.
Notice of Allowance mailed Sep. 30, 2011 for U.S. Appl. No. 11/846,101, 15 pages.
Notice of Allowance mailed Oct. 11, 2011 for U.S. Appl. No. 11/846,119, 10 pages.
Supplemental Response to Office Action filed with the USPTO on Sep. 8, 2011 for U.S. Appl. No. 11/846,101, 10 pages.
Supplemental Response to Office Action filed with the USPTO on Sep. 8, 2011 for U.S. Appl. No. 11/846,119, 9 pages.
Appeal Brief filed with the USPTO on Jan. 18, 2012 for U.S. Appl. No. 11/846,168, 28 pages.
Appeal Brief filed with the USPTO on Feb. 28, 2012 for U.S. Appl. No. 11/846,141, 35 pages.

* cited by examiner

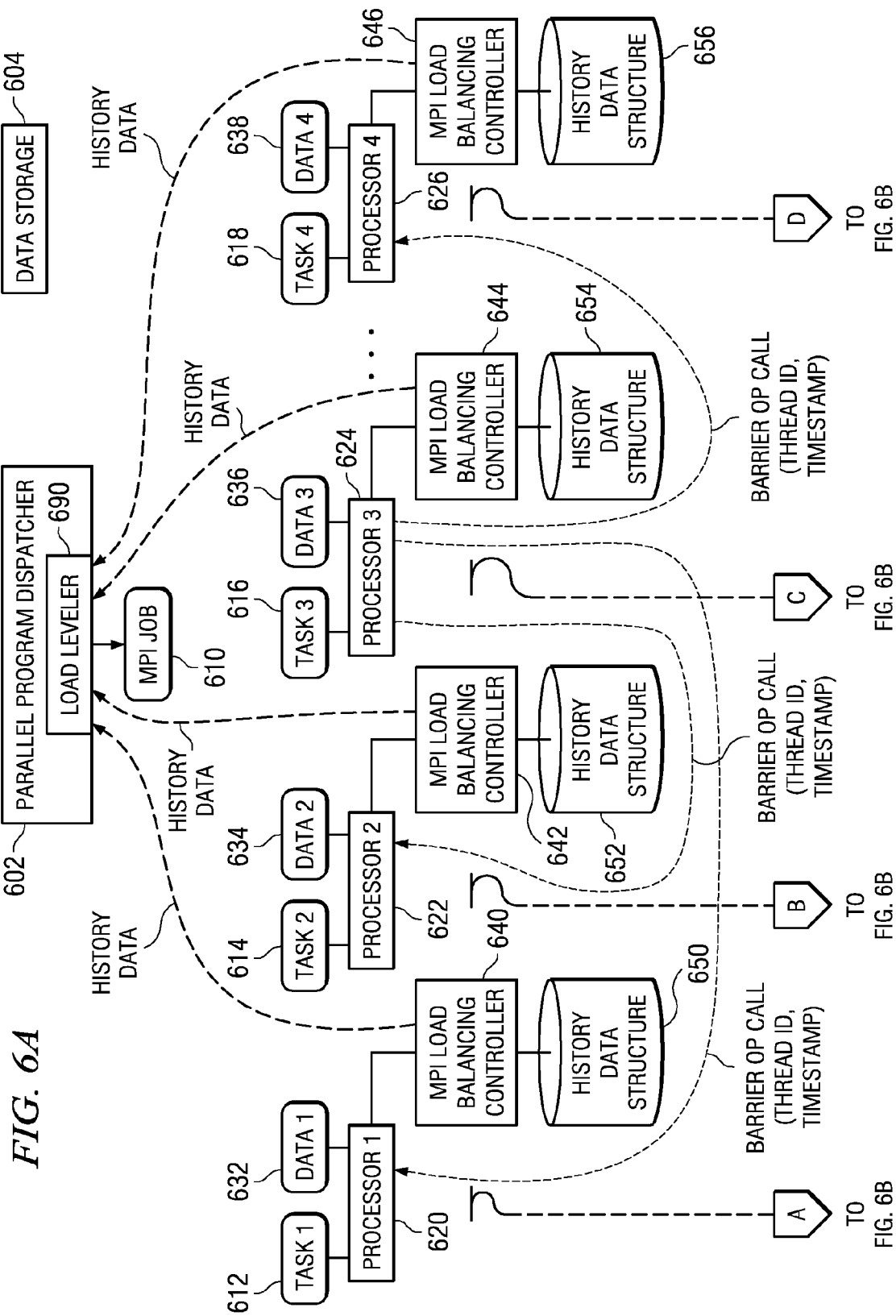

PERFORMING SETUP OPERATIONS FOR RECEIVING DIFFERENT AMOUNTS OF DATA WHILE PROCESSORS ARE PERFORMING MESSAGE PASSING INTERFACE TASKS

GOVERNMENT RIGHTS

This invention was made with Government support under DARPA, HR0011-07-9-0002. THE GOVERNMENT HAS CERTAIN RIGHTS IN THIS INVENTION.

BACKGROUND

1. Technical Field

The present application relates generally to an improved data processing system and method. More specifically, the present application is directed to a system and method for performing setup operations for receiving a different amount of data while processors are performing message passing interface tasks.

2. Description of Related Art

A parallel computing system is a computing system with more than one processor for parallel processing of tasks. A parallel program is a program that may consist of one or more jobs that may be separated into tasks that may be executed in parallel by a plurality of processors. Parallel programs allow the tasks to be simultaneously executed on multiple processors, with some coordination between the processors, in order to obtain results faster.

There are many different approaches to providing parallel computing systems. Examples of some types of parallel computing systems include multiprocessing systems, computer cluster systems, parallel supercomputer systems, distributed computing systems, grid computing systems, and the like. These parallel computing systems are typically distinguished from one another by the type of interconnection between the processors and memory. One of the most accepted taxonomies of parallel computing systems classifies parallel computing systems according to whether all of the processors execute the same instructions, i.e. single instruction/multiple data (SIMD), or each processor executes different instructions, i.e. multiple instruction/multiple data (MIMD).

Another way by which parallel computing systems are classified is based on their memory architectures. Shared memory parallel computing systems have multiple processors accessing all available memory as a global address space. These shared memory parallel computing systems may be further classified into uniform memory access (UMA) systems, in which access times to all parts of memory are equal, or non-uniform memory access (NUMA) systems, in which access times to all parts of memory are not equal. Yet another classification, distributed memory parallel computing systems, also provides a parallel computing system in which multiple processors are utilized, but each of the processors can only access its own local memory, i.e. no global memory address space exists across them. Still another type of parallel computing system, and the most prevalent in use today, is a combination of the above systems in which nodes of the system have some amount of shared memory for a small number of processors, but many of these nodes are connected together in a distributed memory parallel system.

The Message Passing Interface (MPI) is a language-independent computer communications descriptive application programming interface (API) for message passing on shared memory or distributed memory parallel computing systems. With MPI, typically a parallel application is provided as one or more jobs which are then separated into tasks which can be processed in a parallel manner on a plurality of processors. MPI provides a communication API for the processors to communicate with one another regarding the processing of these tasks.

There are currently two versions of the MPI standard that are in use. Version 1.2 of the MPI standard emphasizes message passing and has a static runtime environment. Version 2.1 of the MPI standard includes new features such as scalable file I/O, dynamic process management, and collective communication of groups of processes. These MPI standards are available from MPI forum website. It is assumed for purposes of this description, that the reader has an understanding of the MPI standards.

Of particular note, the MPI standard provides for collective communication of processes or tasks, i.e. communications that involve a group of processes or tasks. A collective operation is executed using MPI by having all the tasks or processes in the group call a collective communication routine with matching arguments. Such collective communication routine calls may (but are not required to) return as soon as their participation in the collective communication is complete. The completion of a call indicates that the caller is now free to access locations in a communication buffer but does not indicate that other processes or tasks in the group have completed or even have started the operation. Thus, a collective communication call may, or may not, have the effect of synchronizing all calling processes.

One way in which MPI enforces synchronization of the processes or tasks is to provide a synchronization operation referred to as the MPI_BARRIER( ) call. The MPI_BARRIER( ) call blocks the caller until all tasks or processes in the group have called MPI_BARRIER( ). Thus, the MPI_BARRIER( ) call is used with a group of tasks which must wait for the other tasks in the group to complete before proceeding to the next tasks, i.e. each task must call MPI_BARRIER( ) before any of the processors are able to execute additional tasks. Essentially, the barrier operation enforces synchronization of the tasks of a job and enforces temporal dependence.

While such synchronization operations aid programmers in generating parallel programs that ensure that dependent tasks are accommodated without errors, the synchronization results in inefficient use of the processor resources. For example, if a processor executes a task in parallel with one or more other processors, and finishes its task before the other processors, then it must wait for each of the other processors to complete their tasks and call the synchronization operation before it can proceed. As a result, there are a number of wasted processor cycles while the fast processors wait for the slower processors to complete. During this time period, the faster processors are still consuming power but are not providing any useful work.

SUMMARY

The illustrative embodiments provide a system and method for performing setup operations for receiving a different amount of data while processors are performing message passing interface tasks. Moreover, the illustrative embodiments provide a system and method for providing hardware based dynamic load balancing of message passing interface (MPI) tasks. In particular, the illustrative embodiments provide mechanisms for adjusting the balance of processing workloads of the processors executing tasks of an MPI job so as to minimize the wait periods, and hence the wasted processor cycles, associated with waiting for all of the processors to call a synchronization operation. With the mechanisms of the illustrative embodiments, each processor has an associated MPI load balancing controller, which may be implemented as a hardware device in, or coupled to, the processors. The hardware implemented MPI load balancing controller maintains a history data structure that provides a history profile of the tasks with regard to their calls to synchronization operations. For example, the history data structure may maintain a listing of the tasks and timestamps of when the tasks call the synchronization operation. In this way, a determination of the relative completion of computation phases by the processors may be made to identify which processors completed their computation phases first, second, third, etc.

From this information, it can be determined which processors should have their processing loads lightened and which processors are able to handle additional processing loads without significantly negatively affecting the overall operation of the parallel execution system. As a result, operations may be performed to shift workloads from the slowest processor to one or more of the faster processors. Of course thresholds may be utilized to determine if the wait periods are sufficient for performing such load balancing operations since there is some overhead in actually performing the load balancing operations and a tradeoff may need to be considered.

In addition, the mechanisms of the illustrative embodiments provide for the overlap of the computation phases of the processors with setup operations for performing redistribution of workloads amongst the processors. That is, mechanisms are provided in the illustrative embodiments for faster processors to begin, based on a knowledge from the history data structure that they have completed the computation phase before other processors in their group operating on the MPI job, setup operations to prepare for accepting a larger workload in a subsequent computation phase. Such setup operations may include, for example, adjusting the allocation of resources so as to provide additional resources for the faster processors to accommodate larger workloads.

In another illustrative embodiment, the mechanisms of the illustrative embodiments may provide mechanisms for dynamically modifying the number of MPI tasks sent to each of the processors. Such mechanisms may be used in cases where the MPI tasks are data dependent. The modification of the number of MPI tasks may involve the adding or removing of tasks from a queue of tasks for the processors, i.e. converging tasks. Thresholds may again be used to determine if the wait periods are degrading performance in a significant enough manner to warrant performing such convergence to obtain better performance. The converging of tasks in this manner involves the MPI load balancing mechanisms associated with the processors communicating with a load leveler of the parallel program dispatcher to cause the load leveler to adjust the number of tasks dispatched to each of the processors in accordance with their historical profile.

In one illustrative embodiment, a method for balancing a Message Passing Interface (MPI) workload across a plurality of processors is provided. The method may comprise receiving one or more MPI synchronization operation calls from one or more processors of the plurality of processors and identifying a first processor, in the plurality of processors, having a fastest time of completion of a computation phase of an associated MPI task, during a computation cycle, based on the received one or more MPI synchronization operation calls, wherein the computation phase of the first associated MPI task involves executing the MPI task on a first data set. The method may further comprise performing a first setup operation in the first processor for preparing to receive a second data set that is larger than the first data set in response to identifying the first processor as having a fastest time of completion of the computation phase. The first setup operation may modify an allocation of resources in the multiple processor system for use by the first processor in receiving the second data set.

The first setup operation may be performed while at least one other processor in the plurality of processors is still in a computation phase of its associated MPI task during the same computation cycle. The first setup operation may comprise at least one of allocating a larger portion of cache memory for use by the first processor, setting up buffer space to receive an additional amount of data for processing by the first processor, or acquiring a host fabric interface window or windows for communication by the first processor.

The method may further comprise identifying a second processor, in the plurality of processors, having a slowest time of completion of a computation phase of a second associated MPI task, during the computation cycle, based on the received one or more MPI synchronization operation calls. The computation phase of the first associated MPI task may involve executing the MPI task on a third data set. The method may also comprise performing a second setup operation in the second processor for preparing to receive a fourth data set that is smaller than the third data set in response to identifying the second processor as having a slowest time of completion of the computation phase. The second setup operation may modify an allocation of resources in the multiple processor system for use by the second processor in receiving the fourth data set. The second setup operation may comprise at least one of allocating a smaller portion of cache memory for use by the second processor, setting up buffer space to receive a smaller amount of data for processing by the second processor, or acquiring a host fabric interface window or windows for communication by the second processor.

The method may further comprise determining if a difference in the fastest time of completion and the slowest time of completion exceeds a threshold. The first setup operation and the second setup operation may be performed in response to the difference exceeding the threshold.

Each processor of the plurality of processors may comprise a MPI load balancing controller. Each MPI load balancing controller may implement the receiving and identifying operations. An MPI load balancing controller associated with the first processor may implement performing the first setup operation. An MPI load balancing controller associated with the second processor may implement performing the second setup operation.

The MPI job may be a set of tasks to be performed in parallel on the plurality of processors. Each processor of the plurality of processors may execute a corresponding task of the MPI job in parallel on a corresponding set of data allocated to the processor from a superset of data.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a plurality of processors and at least one load balancing controller associated with the plurality of processors. The at least one load balancing controller may perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 6A and 6B are an exemplary diagram illustrating a load balancing operation for data dependent MPI jobs in accordance with one illustrative embodiment;

DETAILED DESCRIPTION OF THE ILLUSTRATIVE EMBODIMENTS

Figure 1:
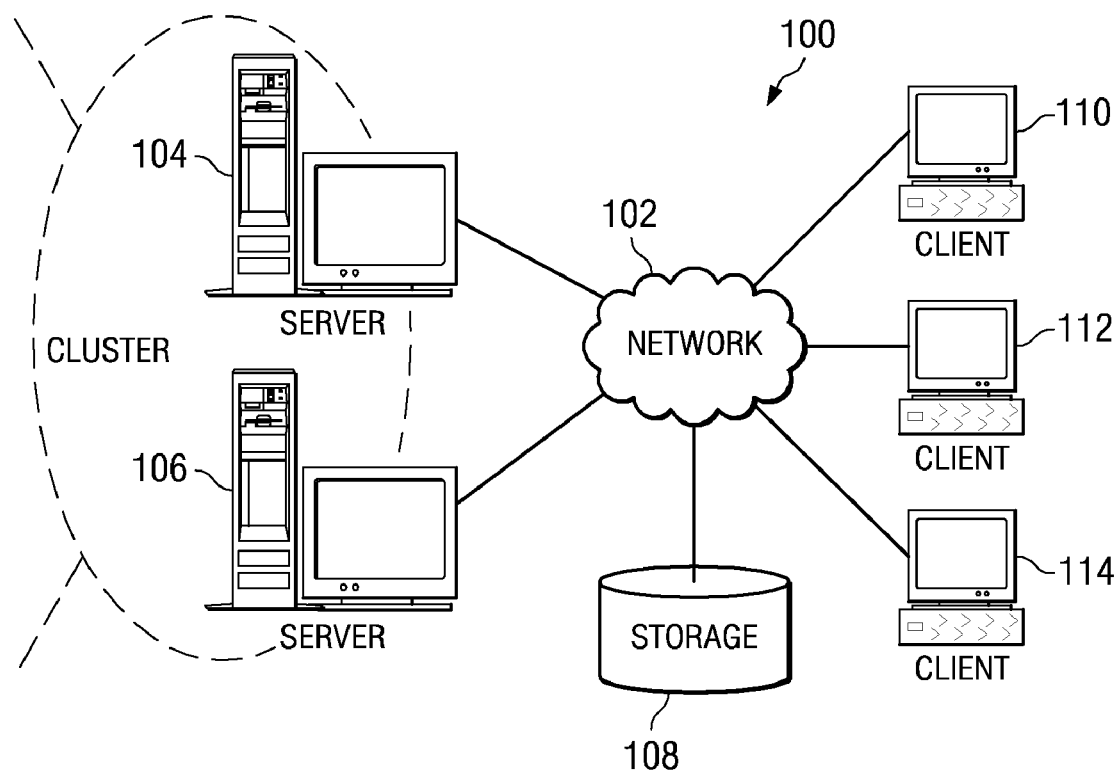
FIG. 1 is an exemplary representation of an exemplary distributed data processing system in which aspects of the illustrative embodiments may be implemented.
Figure 2:
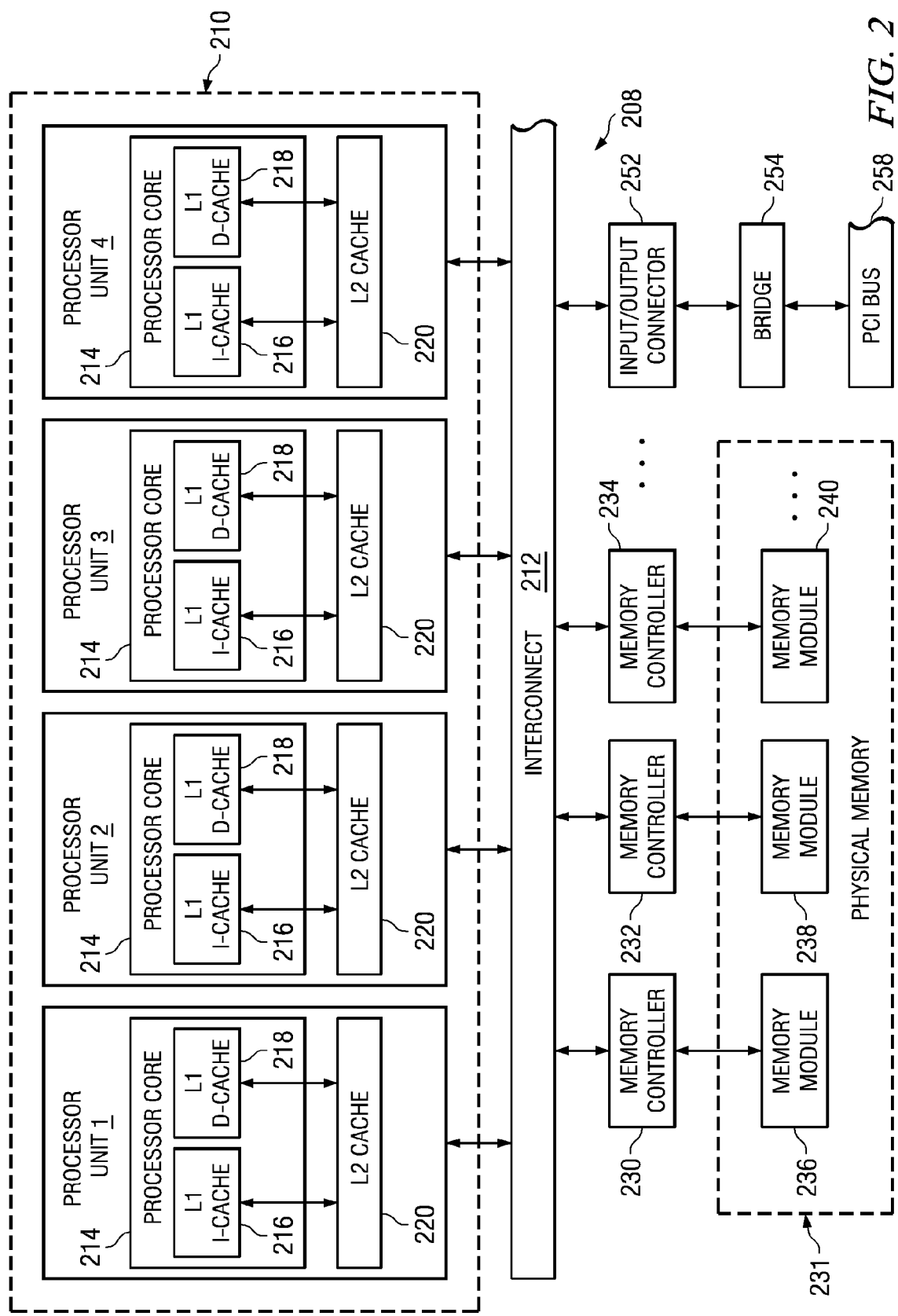
FIG. 2 is a block diagram of an exemplary data processing system in which aspects of the illustrative embodiments may be implemented.

The illustrative embodiments provide a system and method for providing hardware based dynamic load balancing of message passing interface tasks. As such, the illustrative embodiments are especially well suited for use with a distributed data processing system in which a plurality of processors are used for the distribution of parallel program message passing interface tasks for parallel processing. Thus, FIGS. 1-2 are provided hereafter as examples of data processing systems and devices in which the illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

It should be appreciated that the servers 104 and 106, and additional servers if any (not depicted), may be provided as part of a server cluster over which a parallel program having one or more jobs, which in turn have one or more tasks, may be distributed for processing. Alternatively, a parallel program in accordance with the mechanisms of the illustrative embodiments may be provided to a single server, e.g., server 104, which may be a supercomputer or the like, having multiple processors upon which the parallel program may be distributed. The parallel program may be of the type, as is generally known in the art, where similar tasks are performed on each of a plurality of processors but on different sets of data. That is, a superset of data may be partitioned into portions to be provided to a plurality of tasks which each perform similar processing of the data portions assigned to them. The results of such processing may be passed to other processors in the cluster or group for use in further processing portions of data from the superset of data. Moreover, in addition to communicating results data from one processor to another, various communications are supported for communicating state, for synchronization, and the like, via the use of a Message Passing Interface (MPI).

With reference now to FIG. 2, there is illustrated a high-level block diagram of a multiprocessor (MP) data processing system in accordance with one embodiment of the present invention. The MP data processing system may be a single computing device, such as server 104 or 106 in FIG. 1. Alternatively, the processors shown in FIG. 2 may actually be distributed in a plurality of computing devices, such as in a cluster architecture, but which have a communication mechanism, such as wired or wireless links, through which the processors may communicate with each other and with management hardware.

As depicted, data processing system 208 includes a number of processing units 1-4, referred to collectively by the processing unit group 210, coupled for communication by a system interconnect 212. Only one processing unit group 210 is shown in FIG. 2 for simplicity but it should be appreciated that more than one processing unit group may be included in the data processing system 208. In one illustrative embodiment, for example, the processing units 1-4 and/or processing unit group 210 may be implemented as a POWER™ processing chip or chips available from International Business Machines Corporation of Armonk, N.Y.

As depicted in the embodiment of FIG. 2, processing unit 210 contains four processor units 1-4, however, the illustrative embodiments are not limited by any number of processor units and the invention will support any number or type of processor units. For example, the illustrative embodiments may utilize a data processing system having any number of processor units, e.g., 2, 4, 8, 16, 32, etc., in the multi-processor system. Each processing unit group 210 may be provided as one or more integrated circuits including the one or more processor units 1-4 which comprise associated processor cores 214. In addition to registers, instruction flow logic and execution units utilized to execute program instructions, each of processor cores 214 includes associated level one (L1) instruction and data caches 216 and 218, which temporarily buffer instructions and operand data, respectively, that are likely to be accessed by the associated processor core 214.

As further illustrated in FIG. 2, the memory hierarchy of data processing system 208 also includes the physical memory 231, comprising one or more memory modules (shown as memory modules 236, 238 and 240), which form the lowest level of volatile data storage in the memory hierarchy, and one or more lower levels of cache memory, such as on-chip level two (L2) caches 220, which are utilized to stage instructions and operand data from physical memory 231 to processor cores 214. As understood by those skilled in the art, each succeeding lower level of the memory hierarchy is typically capable of storing a larger amount of data than higher levels, but at higher access latency.

As shown, physical memory 231, which is interfaced to interconnect 212 by memory controllers 230, 232 and 234, may store operand data and portions of one or more operating systems and one or more application programs. Memory controllers 230, 232 and 234 are coupled to and control corresponding memory modules 236, 238 and 240, respectively.

Also shown is input/output connector 252, which operates in a similar manner as the processing units 1-4 of the processing unit group 210 when performing direct memory access operations to the memory system. As will be appreciated, the system may have additional input/output connectors, equal to input/output connector 252, connected to interconnect 212. As various input/output devices, such as disk drives and video monitors, are added and removed on PCI bus 258 (or other similar attached buses), input/output connector 252 operates to transfer data between PCI bus 258 and interconnect 212 through bridge 254.

Those skilled in the art will appreciate that data processing system 208 can include many additional un-illustrated components, such as I/O adapters, interconnect bridges, non-volatile storage, ports for connection to networks or attached devices, etc. Because such additional components are not necessary for an understanding of the present invention, they are not illustrated in FIG. 2 or discussed further herein. It should also be understood, however, that the enhancements provided by the present invention are applicable to data processing systems of any architecture and are in no way limited to the generalized MP architecture illustrated in FIG. 2.

In accordance with the illustrative embodiments, a plurality of processors are utilized to perform parallel processing of tasks of a job of a parallel program. With such parallel processing, a superset of data is partitioned into portions of data that may individually be provided to each of the tasks of the job. The tasks may operate on the data to generate results data that may be communicated to neighboring processors in the plurality of processors if the tasks of the neighboring processors require the results for their own processing in a subsequent cycle. The processors may be provided in the same computing device, in a plurality of computing devices that are distributed and in communication with each other via one or more data networks, in a plurality of computing devices of a cluster, or the like. The processors may be part of a multiprocessor (MP) system, such as a symmetric multiprocessor (SMP) system, or the like. Any multiple processor architecture may be used to provide the plurality of processors for executing, in parallel, tasks of jobs corresponding to a parallel program, without departing from the spirit and scope of the present invention.

As mentioned above, in the illustrative embodiments, the plurality of processors support the use of a Message Passing Interface (MPI) through the calling of MPI functions provided in one or more MPI Application Program Interfaces (APIs). The mechanisms of the illustrative embodiments provide additional functionality for affecting the execution of the parallel program in a parallel and distributed manner based on a history of the way in which the parallel program is executed in the multiple processor system. This history may be maintained and dynamically updated in a history data structure whose entries identify which processors in the multiple processor system should perform which operations to achieve a desired execution of the parallel program.

The affecting of the execution of the parallel program may comprise, for example, providing a load balancing functionality for reducing the number of wasted processor cycles due to waiting for all tasks of a group, i.e. a job, to return a synchronization operation call. Various load balancing operations may be performed to balance the processing load of the tasks on the various processors so that each of the processors completes its computations in approximately the same time period, thereby reducing the number of wasted processor cycles.

In addition to load balancing for a primary parallel program that is being run, the mechanisms of the illustrative embodiments may affect the execution of the primary parallel program by selecting to run another program during any relatively idle time, or within any "dead space," during execution of the primary parallel program. For example, if it is known that there will be a long delay between the first and last process to arrive at a barrier operation, another program may be run on processors that would otherwise be idle waiting for the last process to arrive at the barrier operation.

Moreover, the operating system or other applications may perform housekeeping tasks, such as memory management and garbage collection operations, during these times of relative idleness. As is generally known in the art, memory management operations are operations for allocating portions of memory to programs at their request and freeing memory for reuse when no longer needed. Garbage collection is a type of memory management in which a garbage collector attempts to reclaim "garbage," i.e. memory used by objects that will never be accessed again by an application. It should be appreciated that other types of housekeeping tasks may also be performed by the operating system or applications when an associated processor is in a relatively idle state without departing from the spirit and scope of the illustrative embodiments.

Furthermore, the mechanisms of the illustrative embodiments may select to place the faster processors/nodes, i.e. the ones reaching the barrier operation first, in a lower power state during their idle periods. Knowing ahead of time, based on the history information mentioned above, that an idle period may exist is helpful in determining whether to enter a lower power state since doing so requires some time to perform. Any functionality for modifying the execution of the primary parallel program, such as by changing the state of the processors/nodes that have already reached a barrier operation, may be performed without departing from the spirit and scope of the present invention.

Figure 3:
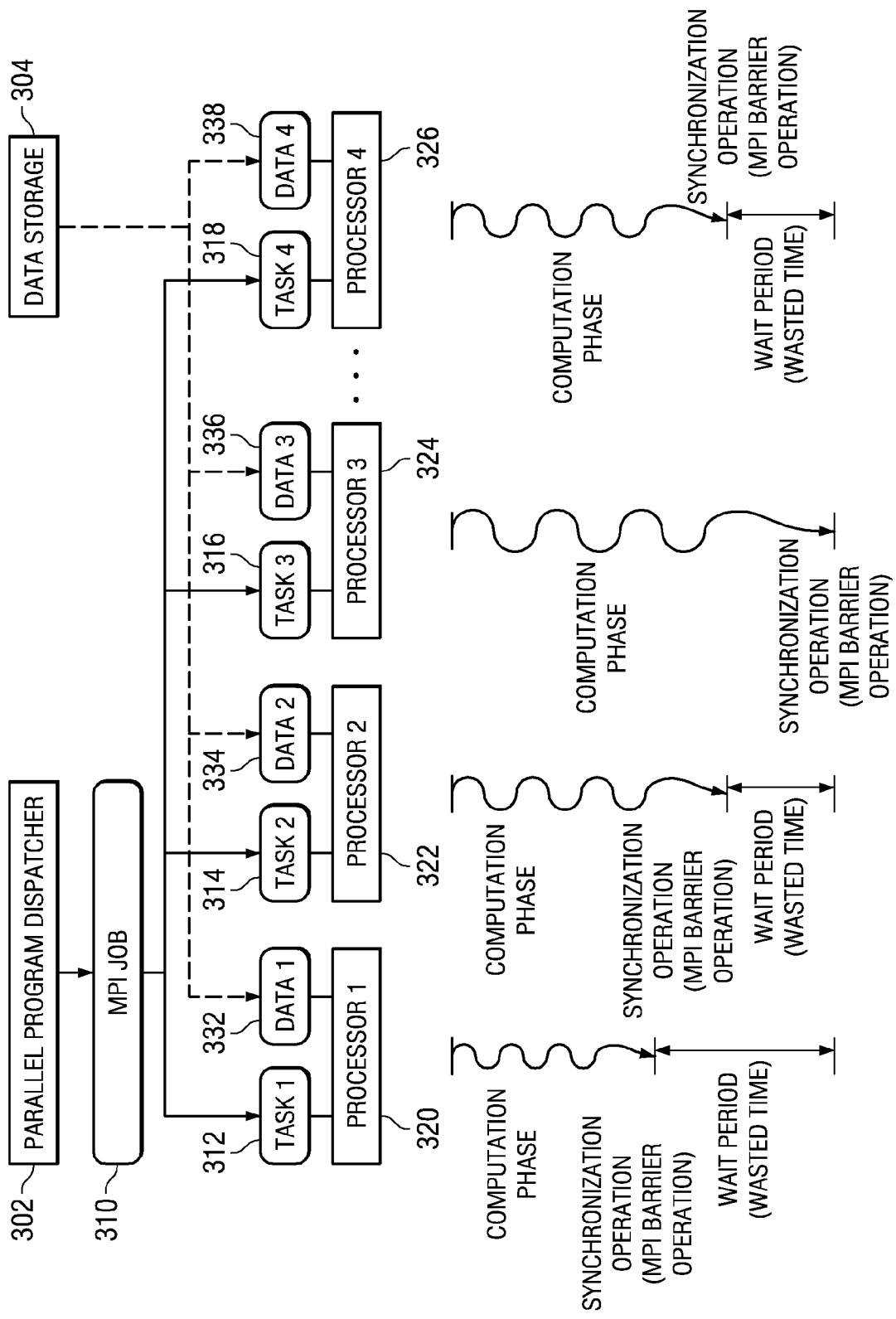
FIG. 3 is an exemplary diagram illustrating a wasted processor cycle problem with Message Passing Interface (MPI) parallel execution systems.

FIG. 3 is an exemplary diagram illustrating a wasted processor cycle situation with Message Passing Interface (MPI) parallel execution systems. As shown in FIG. 3, a parallel program may be comprised of one or more MPI jobs 310 (only one of which is shown for clarity), which may be dispatched to a plurality of processors 320-326 of a parallel execution system. As discussed above, the parallel execution system may take many different forms including clusters of data processing devices, multiprocessor devices, and/or the like. For purposes of this description, it will be assumed that each of the processors 320-326 are provided in separate data processing devices that are in communication with one another via one or more data communication links, such as in a cluster arrangement or the like.

The MPI job 310 is essentially a group of tasks 312-318 that are to be executed in parallel on the plurality of processors 320-326. As is generally known in the art, parallel programs are typically programmed for separation into jobs which in turn are designed for separation into tasks to be performed in parallel. Similarly, the data upon which the parallel program is to execute may be partitioned into sets to be processed in parallel by the tasks 312-318. In some illustrative embodiments, the tasks 312-318 may be substantially the same but may be executed on different sets of data 332-338 from a superset of data stored in the data storage 304. For example, the tasks 312-318 may be clones or replicated instances of the same original task. In other illustrative embodiments, the tasks 312-318 may be different from one another and may operate on the same or a different set of data 332-338.

As shown in FIG. 3, each processor 320-326 executes its corresponding task 312-318 on a portion of data 332-338. The portion of data 332-338 that a particular processor 320-326 receives is communicated to the processor 320-326 by the parallel program dispatcher 302 by sending, for example, an ending address, and possibly a starting address if necessary, within the data superset in the data storage 304 for each processor. Each processor 320-326 may then read that data, such as via a Remote Direct Memory Access (RDMA) operation, from the data storage 304 and process it according to the associated task 312-318. Preferably, the ending addresses and starting addresses of portions of data are communicated to the processors, such as via MPI communications. The starting and ending addresses may be distributed in such a manner as to provide a same size data set 332-338 to each of the processors 320-326. It should be appreciated that, in some exemplary implementations, it may not be necessary to communicate both the starting address and the ending address of a portion of data and only one of the starting address or the ending address is needed to define the size of the data set.

The period of time in which the processors 320-326 execute the instructions of their tasks 312-318 on their portion of data 332-338 is referred to herein as the computation phase. For example, parallel programs are often developed to perform the same task on different sets of data in parallel using a plurality of processors. As one example, parallel programs have been developed to analyze DNA codes such that the same computations are performed by each of a plurality of tasks of an MPI job but on different sets of DNA coding data. Thus, in the computation phase, each of the processors 320-326 may execute instructions on different sets of data 332-338. Alternatively, the data sets 332-338 may be the same set of data but with the tasks 312-318 that are performed being different.

In either case, since there is some measure of difference in the computations being performed in the computation phase between processors 320-326, there is the possibility that the computation phase may require a different amount of processor cycles, or time, to complete in each of the processors 320-326. Many different factors may affect how long the computation phase is for each of the processors 320-326. For example, one processor 320 may perform a computation in which the data used as part of the computation is consistently found in the processor's L1 data cache while another processor 324 may have to access main memory to complete its computations, resulting in a greater latency.

Typically, in MPI jobs, the tasks 312-318 must be synchronized at some point in order to ensure proper operation and execution of the MPI job 310 and the parallel program. One way in which MPI tasks are synchronized is to make a call to a synchronization operation when the computation phase of the task is completed. In the current MPI standard, this synchronization operation is referred to as the MPI barrier operation, i.e. the MPI_BARRIER( ) function call. With this synchronization mechanism, the processors 320-326 are not permitted to continue execution of tasks until all of the processors 320-326 communicate, via point-to-point communications facilitated by the MPI APIs, that their computation phases are complete by calling the synchronization operation, i.e. the barrier operation. When the MPI barrier operation is called, this call is communicated to each of the other processors 320-326 executing tasks in the MPI job 310. Once each of the processors 320-326 perform a call to the MPI barrier operation, results data, obtained as a result of the computations performed during the computation phases, may be communicated between the processors 320-326, e.g., from a processor to each of its neighboring processors 320-326 in a cluster of processors, and the processors 320-326 are permitted to continue execution of tasks based on this results data and other data sets, if any, provided to the tasks.

It can be seen from FIG. 3 that because the processors 320-326 may complete the computation phase at various times relative to the other processors 320-326 executing tasks 312-318 of the MPI job 310, some processors, e.g., processors 320, 322, and 326, may experience wait periods where they wait for one or more of the other processors, e.g., processors 322-326, to complete their computation phase and perform a call to the synchronization operation, i.e. the barrier operation. This wait period is essentially wasted processor cycles in which the processor is powered on and in an idle state not producing any useful work. Thus, the processors in the wait period consume power but provide no useful work in return. This results in a loss of possible computations within the same time period, i.e. because of the wasted processor cycles, a smaller number of computations may be performed using the MPI mechanism shown in FIG. 3 than if the wait periods were able to be avoided. From empirical data, it has been determined that in some architectures, this loss of computation may be on the order of a 20% loss in computation ability.

The illustrative embodiments provide mechanisms for adjusting the balance of processing workloads of the processors 320-326 executing tasks 312-318 of an MPI job 310 so as to minimize the wait periods, and hence the wasted processor cycles, associated with waiting for all of the processors to call a synchronization operation. Alternatively, as mentioned above, rather than performing load balancing operations, or in addition to performing load balancing operations, the mechanisms of the illustrative embodiments may perform other operations, such as executing other programs, performing housekeeping operations such as memory management or garbage collection operations, or placing idle processors in a low power state, in order to minimize the waste associated with processors waiting for all of the processors performing MPI job tasks to call an MPI synchronization operation.

With regard to load balancing, each processor has an associated MPI load balancing controller, which may be implemented as a hardware device in, or coupled to, the processors. The hardware implemented MPI load balancing controller maintains a history data structure that provides a history profile of the tasks 312-318 with regard to their calls to synchronization operations. For example, the history data structure may maintain a listing of the tasks and timestamps of when the tasks call the synchronization operation. In this way, a measure of the relative completion of computation phases by the processors may be made, such as based on the timestamp information, to identify which processors completed their computation phases first, second, third, etc. For example, this measure may represent a difference between the completion time for a processor and the completion time of a fastest/slowest processor's call to a MPI synchronization operation. Such measures may then be used to determine if and how much of a workload to shift within the processors 320-326.

That is, from this history data structure information, it can be determined which processors should have their processing loads lightened and which processors are able to handle additional processing loads without significantly negatively affecting the overall operation of the parallel execution system. As a result, operations may be performed to shift workloads from the slowest processor to one or more of the faster processors. Of course thresholds may be utilized to determine if the wait periods are sufficient for performing such load balancing operations since there is some overhead in actually performing the load balancing operations and a tradeoff may need to be considered.

In addition, the mechanisms of the illustrative embodiments provide for the overlap of the computation phases of the processors with setup operations for performing redistribution of workloads amongst the processors. That is, mechanisms are provided in the illustrative embodiments for faster processors to begin, based on a knowledge from the history data structure that they have completed the computation phase before other processors in their group operating on the MPI job 310, setup operations to prepare for accepting a larger workload in a subsequent computation phase. Such setup operations may include, for example, adjusting the allocation of resources so as to provide additional resources for the faster processors to accommodate larger workloads.

In another illustrative embodiment, the mechanisms of the illustrative embodiments may provide mechanisms for dynamically modifying the number of MPI tasks sent to each of the processors. Such mechanisms may be used in cases where the MPI tasks are data dependent. The modification of the number of MPI tasks may involve the adding or removing of tasks from a queue of tasks for the processors, i.e. converging tasks. Thresholds may again be used to determine if the wait periods are degrading performance in a significant enough manner to warrant performing such convergence to obtain better performance. The converging of tasks in this manner involves the MPI load balancing mechanisms associated with the processors communicating with a load leveler of the parallel program dispatcher to cause the load leveler to adjust the number of tasks dispatched to each of the processors in accordance with their historical profile.

Figure 4A:
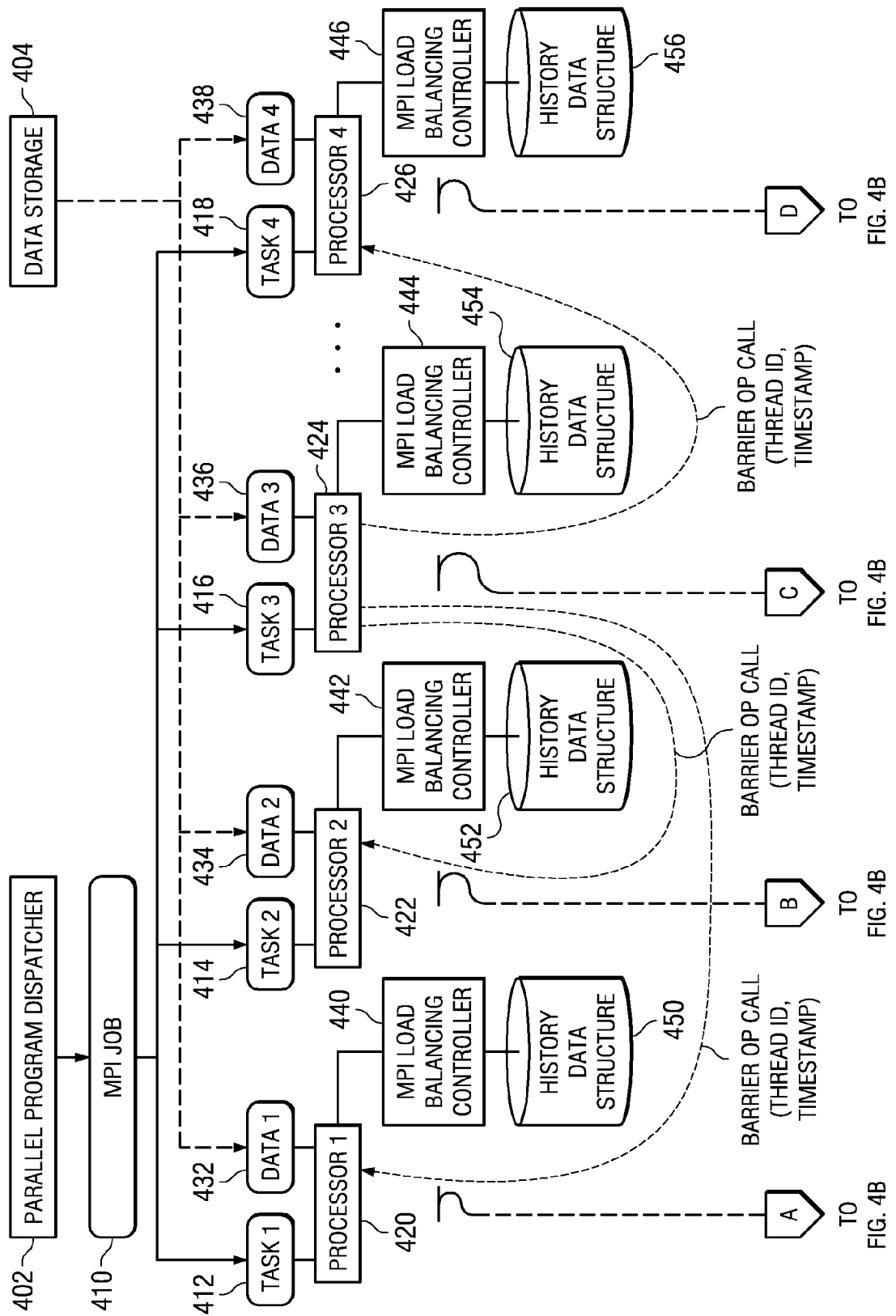
FIGS. 4A and 4B are an exemplary diagram illustrating an operation for balancing the load of MPI tasks across a plurality of processors so as to minimize wasted processor cycles in accordance with one illustrative embodiment.
Figure 4B:
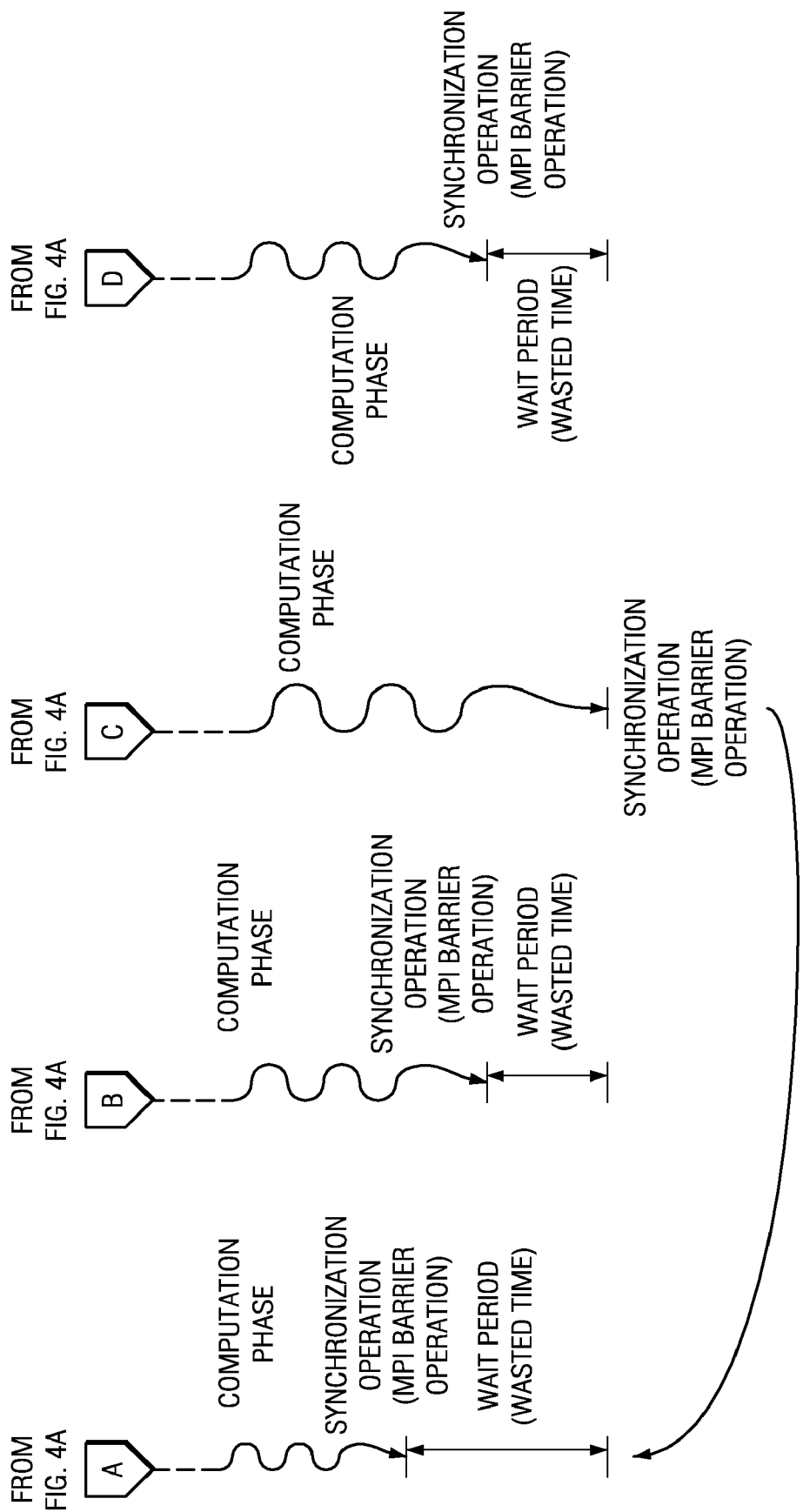

FIGS. 4A and 4B are an exemplary diagram illustrating an operation for balancing the load of MPI tasks across a plurality of processors so as to minimize wasted processor cycles in accordance with one illustrative embodiment. The operation shown in FIGS. 4A and 4B assumes that there is a uniform computation between tasks, i.e. that the operation of the tasks is not data dependent. The tasks may all perform the same computations, just on different sets of data, or may be different from one another operating on the same or different sets of data.

A non-data dependent MPI job is defined as an MPI job in which the amount of computation performed during the computation phase is not dependent on the type of data that is received for processing. In other words, if all of the processors receive the same amount of data, and there are no other factors to cause an increase in the computations performed during the computation phase, all of the processors should return a MPI barrier operation call at the same time. In the data dependent case, the amount of computation performed during the computation phase is dependent upon the type of data received for processing. Thus, even if the same amount of data is received by each processor, and there are no other factors to increase the amount of computation, the type of data itself may cause the computation phase to be extended or shortened for various processors.

As shown in FIGS. 4A and 4B, when each processor 420-426 finishes its computations during the computation phase of the MPI task 412-418 that it is executing on a corresponding data set 432-438, the processor 420-426 calls a synchronization operation, i.e. the MPI barrier operation. The call of this MPI barrier operation is communicated to each of the other processors 420-426. For simplicity, the communication of the MPI barrier operation to each of the other processors 420, 422, and 426 is shown only for processor 424, but it should be appreciated that each processor 420-426 would communicate their own MPI barrier operation call to each of the other processors when it occurs. In addition to simply informing the other processors 420-426 that the processor called the MPI barrier operation, an identifier of the task, such as a task id or thread id, and a timestamp of the MPI barrier operation call are provided to each of the processors 420-426. This information may be communicated by each of the processors 420-426 to their associated MPI load balancing controllers 440-446.

The MPI load balancing controllers 440-446 maintain corresponding history data structures 450-456 that comprise entries having the task or thread id and a corresponding timestamp for each MPI barrier operation call of each of the processors 420-426. Thus, each of the history data structures 450-456 should be identical such that each of the MPI load balancing controllers 440-446 have the same picture of the historical operation of the parallel execution system with regard to the MPI tasks 412-418. The MPI load balancing controllers 440-446 further contain logic for performing analysis of the entries in the corresponding history data structures 450-456 to determine how to redistribute workloads amongst the processors 420-426 so as to minimize wait periods of the processors 420-426.

The logic in the MPI load balancing controllers 440-446 analyzes the entries in the history data structures 450-456 to determine if the processor 420-426 associated with the MPI load balancing controller 440-446 should expect to receive a larger workload, smaller workload, or the same workload in a subsequent computation phase as a previous computation phase. This determination may be made, for example, in response to each MPI barrier operation call notification received by the processor, either from its own call to the MPI barrier operation or a call from another processor. For example, in response to an MPI barrier call notification, the thread id and timestamp of the MPI barrier call may be provided to the MPI load balancing controller 440 which stores an entry in the history data structure 450.

In addition, the MPI load balancing controller 440 may determine if any other processor 420-426 has performed a MPI barrier operation call prior to this MPI barrier operation call notification for the same computation cycle, i.e., each processor begins its computation phase at the same time due to the synchronization performed and thus, each start of computation phases for the group of processors is referred to as a computation cycle. If no other processor 420-426 has performed a MPI barrier operation call prior to this MPI barrier operation call, then the processor that sent the current MPI barrier operation call, e.g., processor 420, is the fastest processor in the group of processors 420-426 executing tasks 412-418 of the MPI job 410. As a result, the processor 420 may begin operations to prepare for receiving a larger workload for the next computation cycle. For example, the processor 420 may perform operations for obtaining a larger allocation of cache memory for use by the processor, setting up buffer space to receive an additional amount of data, acquire a host fabric interface (HFI) window or windows for communication, and/or the like.

In addition to determining if the processor 420 is the fastest processor, the MPI load balancing controller 440 may determine if there are any additional processors 420-426 that are still in the computation phase and have not returned a MPI barrier operation call. This determination may be made, for example, based on the task identifiers or thread identifiers returned with the MPI barrier operation calls from the processors 420-426 that have already made MPI barrier operation calls. Based on a knowledge of the task or thread identifiers that make up the MPI job 410, the MPI load balancing controller 440 may determine which, if any, task or thread identifiers have not been returned in an MPI barrier call.

If there are still processors 420-426 engaged in the computation phase, then the MPI load balancing controller 440 may determine if its own processor, e.g., processor 420, is the last processor 420-426 in the computation phase. That is, if there is only one task or thread identifier that has not been returned in a MPI barrier operation call, and that task or thread identifier matches the task or thread identifier of the MPI load balancing controller's associated processor's task or thread, then it can be determined that the processor 420 associated with the MPI load balancing controller 440 is the slowest processor of the group. If its own processor is the last one in the computation phase, the MPI load balancing controller 440 may begin operations to prepare for receiving a smaller workload, i.e. smaller amount of data to process, in the next computation cycle. Such operations may include, for example, reducing the allocated cache for the processor, reducing the allocated buffers for receiving data for the next computation cycle, determining an ending address offset for the data to be sent to the fastest processor by computing an amount of data to be shifted to the fastest processor, releasing HFI windows for communication, and/or the like.

Once the last of the processors 420-426 in the group has returned a MPI barrier operation call, the next cycle of computation may begin. Results data may be communicated between neighboring processors 420-426 prior to the start of the next cycle of computation, if necessary. One common scenario in which processors must communicate data values occurs with data that lies along the border between two processors, i.e. data computed by one processor that is to be used by a neighboring processor. This data will need to be used by each of the two processors on either side of the border. Thus, the values of this data are communicated between the two neighboring processors. This does not increase the amount of data that is processed by processors, but only changes the values of the data that the processors are utilizing.

Typically, each processor 420-426 obtains their initial chunk of data to work on from the initial distribution of data discussed above. As the computation cycle progresses, the data that lies along the border between two processors, i.e. data computed by one processor that is to be used by a neighboring processor, will need to be used by each of the two processors on either side of the border. Thus, the values of this data are communicated between the two neighboring processors. This does not increase the amount of data that is processed by processors, but only changes the values of the data that the processors are utilizing.

Prior to starting the next cycle of computation, the slowest processor 424, which has been preparing to receive less data in the next computation cycle, transmits to the previously determined fastest processor 420, via an MPI communication, an ending address offset for the set of data to be processed by the fastest processor 420. This ending address offset is added to the ending address provided to the processor 420 from the parallel program dispatcher 402 as the next data set for the processor 420 to process. In this way, the size of the data set processed by the processor 420 may be increased by changing the ending address in the data superset at which the processor 420 is to stop processing in the next computation cycle. Similarly, an address offset for the slowest processor 424 may also be computed and used in a similar manner to reduce the data set processed by the slowest processor 424 in the next computation cycle by a similar amount as the address offset increases the size of the data set for the fastest processor 420. In effect, this causes a shift of data from the slowest processor 424 to the fastest processor 420. The processors 420-426 may then read their data sets, such as by performing an RDMA read operation, from the data storage 404 based on their starting and ending addresses, as modified by the address offsets if applicable.

It should be appreciated that the manner by which the ending address offset is calculated may be performed in any desirable manner. As one example, in a parallel program or application that is regularly partitioned, the ending address offset may be generated based on a linear relationship between an amount of data and a time difference between the fastest and slowest processors. This linear relationship may be provided via a mathematical function, lookup table data structure, or the like, that correlates an amount of time difference with an amount of data to be shifted from one processor to another. Thus, based on a determined time difference between the fastest and slowest processors, a corresponding amount of data to be shifted may be identified. The ending addresses, and hence the starting addresses, of the portions of data allocated to the affected processors may then be modified by this amount of data by applying a corresponding offset that is equivalent to the amount of data. In other words, a simple ratio of the amount of data per unit time may be utilized and the ending address offset may be set such that a corresponding amount of data may be moved between processors.

It should further be appreciated that one benefit of the illustrative embodiments is that by shifting workloads, such as by changing the size of data sets processed by the various processors, any heterogeneity between processors may be compensated for. That is, an MPI job may be run on a cluster of devices having processors with differing capabilities, e.g., faster or slower processing cores, more or less memory, and the like. By using the mechanisms of the illustrative embodiments, these differences in computational ability can be automatically adjusted for without the programmer/user having to know there is any heterogeneity in the cluster. The processors having fewer resources will be slower, in general, and thus, work will be shifted to the processors having a larger amount of resources automatically.

Figure 5:
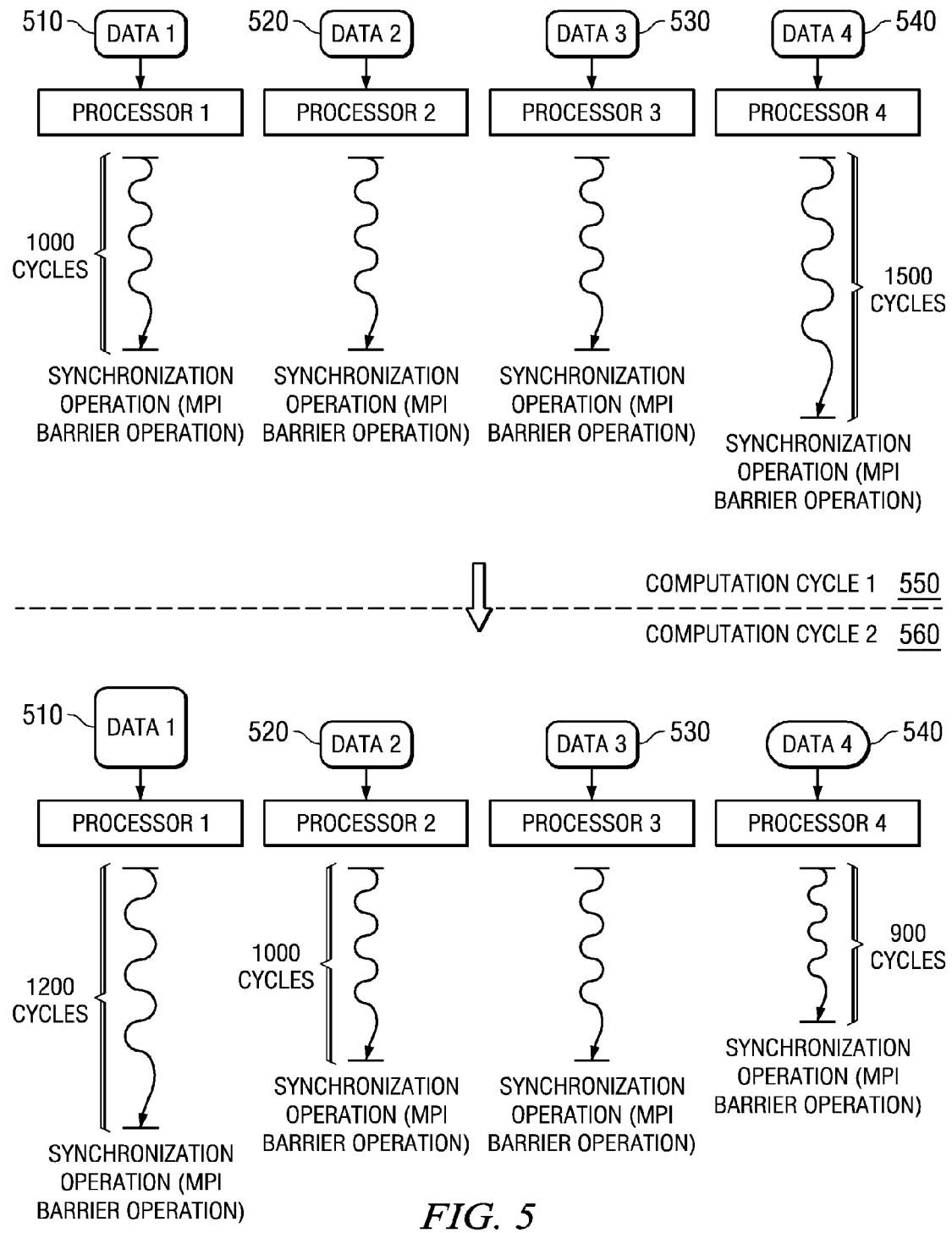
FIG. 5 is an exemplary diagram illustrating the shifting of workloads between slowest and fastest processors, in accordance with one illustrative embodiment, over a set of computation cycles.

FIG. 5 is an exemplary diagram illustrating the shifting of workloads between slowest and fastest processors, in accordance with one illustrative embodiment, over a set of computation cycles. As shown in FIG. 5, initially, each processor in the multiple processor system is provided with the same size data set 510-540. During a first computation cycle 550, the first through third processors all complete their computation phase and perform MPI barrier operation calls after 1000 processor cycles or 1000 time units. The fourth processor, under certain conditions, e.g., having to go to main memory because of cache misses, etc., takes longer and completes its computation phase in 1500 processor cycles or time units. This amounts to each of the first through third processors having to wait 500 processor cycles/time units before they can continue on with the next computation cycle.

As a result, the data set in the next computation cycle is reduced for the fourth processor and increased for the first processor. Thus, in the second computation cycle 560, the first processor completes its computation phase in 1200 processor cycles or time units, the second and third processors again complete their computation phases in 1000 processor cycles/time units, and the fourth processor completes its computation phase in 900 processor cycles/time units. As a result, rather than each of the faster processors having to wait 500 processor cycles/time units before continuing to the next computation cycle, the faster processors only have to wait a maximum of 300 processor cycles/time units. This process may be repeated until a sufficiently low wait period is achieved. A processor may continue to receive its increased or decreased size data set until a rebalancing of the workloads calls for the data sets to again be adjusted. Thus, a more balanced computation phase is achieved with a reduction in wait time or wasted processor cycles.

It should be appreciated that while the above description of the illustrative embodiments refers to the shifting of a workload from a slowest processor to only a single fastest processor, the present invention is not limited to such. Rather, the slowest processor may shift workloads to more than one faster processor without departing from the spirit and scope of the present invention. In such an illustrative embodiment, the timestamps associated with the MPI barrier operation calls performed by the processors 420-426 in FIGS. 4A and 4B, for example, may be used to determine which processors 420-426 are the fastest processors 420-426, i.e. the processors that completed their computation phase in the shortest amount of time. A predetermined, or dynamically determined, number of processors may be selected to which workload from the slowest processor, i.e. the processor that completed the computation phase in the longest amount of time, may be shifted. The number of processors may be dynamically determined in any suitable manner based on dynamic characteristics of the multiple processor system in which the MPI job is executing. For example, the number of processors may be determined based on a difference between the timestamp of the MPI barrier operation call of the fastest processor and the timestamp of the MPI barrier operation call of the slowest processor. This timestamp may be compared to one or more threshold values to determine a number of fastest processors to select for shifting the workload from the slowest processor.

The amount of workload shifted may be distributed evenly over the selected number of fastest processors or may be distributed according to a weighting scheme based on characteristics of the fastest processors. For example, relative weights may be determined based on the ranking (fastest, second fastest, third fastest, etc.) and relative time difference between the MPI barrier operation calls and these weights may be used to determine how much of the workload that is being shifted should be apportioned to each of the selected fastest processors. Other schemes for distributing a workload to be shifted over a plurality of processors may be used without departing from the spirit and scope of the present invention.

The above description of the illustrative embodiment assumes that the identification of the fastest and slowest processors is performed on-the-fly as MPI barrier operation calls are received in the MPI load balancing controllers 440-446 in FIGS. 4A and 4B. However, rather than performing the identification operations on-the-fly, such identification operations may be performed after all of the MPI barrier operation calls from all of the processors 420-426 have been received in each of the MPI load balancing controllers 440-446. At that time, the fastest and slowest processors may be identified by performing a simple comparison of the timestamps of the MPI barrier operation calls. The other operations described above for performing load balancing between the slowest and fastest processors may then be performed based on this identification.

Moreover, the above description assumes that the MPI load balancing controllers 440-446 shift workloads from the slowest processor to the fastest processor(s) any time there is a difference in the time it takes to complete the computation phase. However, in reality, some measure of difference in computation phase is acceptable so as to avoid the overhead of performing the load balancing operations. Thus, a threshold may be used for determining when the discrepancy between the timestamps of the MPI barrier operation calls of the fastest and slowest processors is sufficient to warrant a load balancing operation to be performed. In this way, the overhead of the load balancing operations may be weighed against the amount of wait period, and thus wasted processing cycles, experienced by the fastest processor(s).

The operations described above may be repeated with each new computation cycle such that the excess workload from the slowest processor is shifted to one or more faster processors if necessary. A processor continues to use the end address offset that has been assigned to it until the situation with the multiple processor system dictates that another shift of the workload from the slowest processor to one or more faster processors is necessary. Thus, once the fastest processor receives a larger data set, it will continue to receive that larger data set in future computation cycles until load balancing reduces that data set.

It should further be appreciated that while the above illustrative embodiments have been described in terms of using address offsets to adjust the ending address of the data sets, the present invention is not limited to such. Rather, any mechanism for shifting the workload of one processor to one or more other processors may be used without departing from the spirit and scope of the present invention.

As mentioned above, the illustrative embodiments previously described in FIGS. 4-5 are directed to the case where the tasks 412-418 performed by the processors 420-426 are not data dependent. Such workload shifting cannot be performed when the tasks 412-418 are data dependent since shifting data from one processor to another may corrupt the results obtained from the computations performed by virtue of the fact that the tasks are dependent upon the particular type of data that is received for processing. In the data dependent case, it becomes necessary for the workloads to be balanced at a higher level than at the MPI load balancing controller level.

Figure 6B:
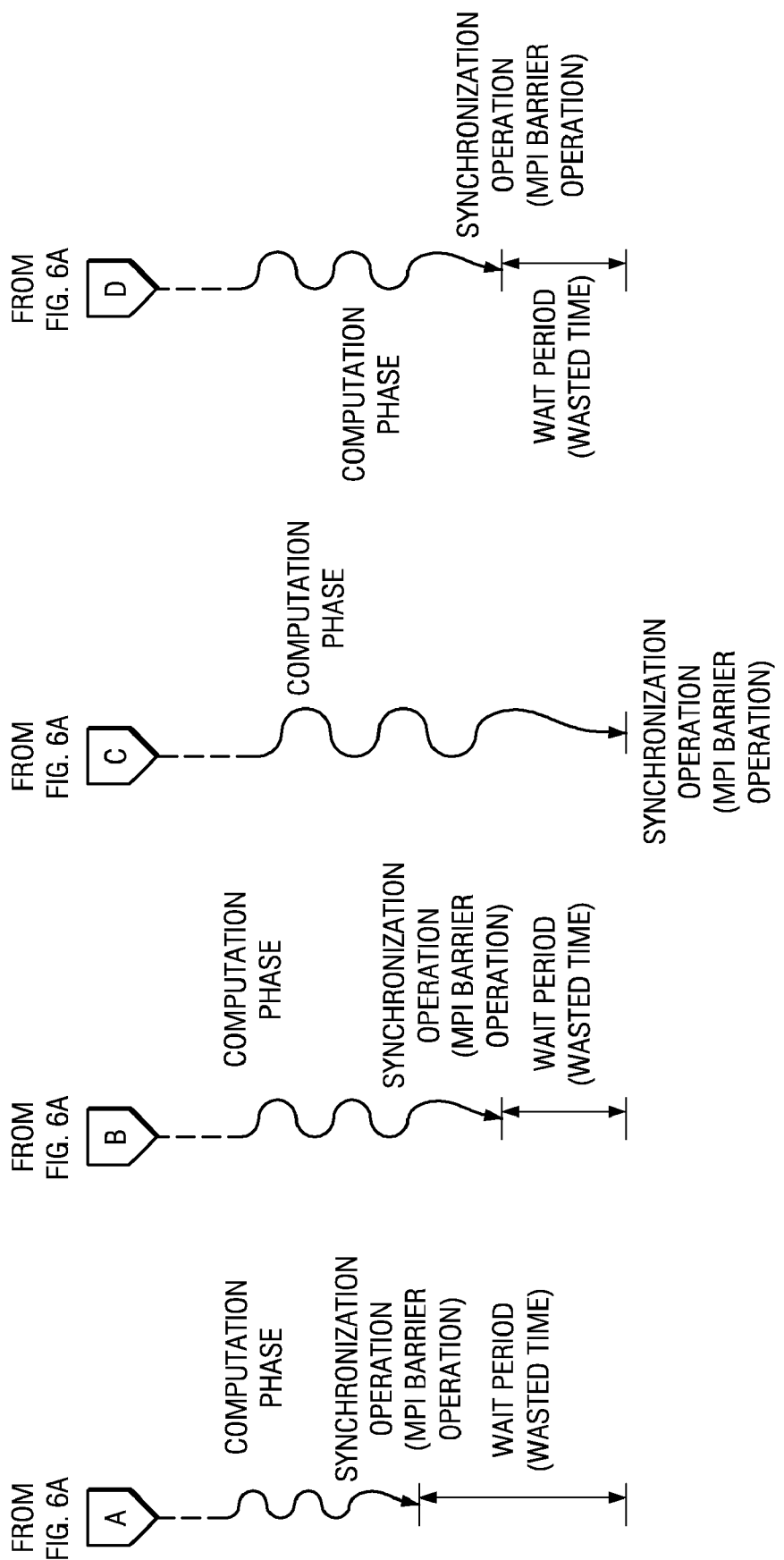

FIGS. 6A and 6B are an exemplary diagram illustrating a load balancing operation for data dependent MPI jobs in accordance with one illustrative embodiment. Elements in FIGS. 6A and 6B not specifically referenced in the following description, e.g., elements 604, 610, 612-618, 620-626, and 632-638 may operate in a similar manner as their counterpart elements shown in FIGS. 4A and 4B. As shown in FIGS. 6A and 6B, the MPI load balancing controllers 640-646 monitor the workloads of the processors in the manner previously described above. However, rather than shifting work from one processor to another by moving data between the processors, the mechanisms of the depicted embodiment, in response to determining that the wait period is excessively large, i.e. is greater than a threshold amount of processor cycles or time units, reports back the history information in the history data structures 650-656 to a load leveler 690 of the parallel program dispatcher 602. The load leveler 690 analyzes the history information from each of the history data structures 650-656, or alternatively, a single one of the history data structures 650-656 if all of the history data structures 650-656 are maintained consistent with each other, and determines an appropriate operation for balancing the load across the processors so as to minimize the wait period, and thus, the wasted processor cycles and available computation time, while taking into account the data dependency of the tasks.

One way in which the load leveler 690 may distribute the load across the processors is to generate additional tasks for the faster processors while keeping the number of tasks assigned to the slower processor the same or even possibly converging the tasks. That is, typically an MPI program is executed such that there is exactly one MPI task per processor in the system of processors. Therefore, moving a task from a slowest processor to a fastest processor will only have the effect of slowing down the faster processor by providing it twice as much work to do. Meanwhile, the slowest processor will have nothing to do and will remain idle thereby wasting resources. Rather than taking this approach, however, in one illustrative embodiment, the load leveler 690 views the MPI job or program as having a predefined amount of work A that may be distributed over N processors with each processor usually being allocated a portion A/N of the work to do in the form of N tasks. "Work" in this context means a portion of a matrix or some other type of data structure that the processor must process in accordance with the instructions in the MPI program.

If one processor is able to perform its A/N portion of work faster than the other processors, such as because of a dependence of the time it takes to complete the work on the data itself, a load imbalance occurs. Thus, in order to rebalance the system, it is important to be able to provide more work to the faster processor, thereby essentially slowing it down, and optionally less work to the slower processor(s) so that they are able to perform their MPI task faster. One way to do this is to give the MPI task assigned to the faster processor more work by increasing the size of the portion of data that it must process and reducing the size of the portion of data the slower processor(s) must process. This option has been described in detail above.

Another option is to allocate additional tasks to the faster processor for it to run concurrently. This essentially increases the amount of useful work being done by the faster processor, slows the faster processor down because of the additional load on its resources, and thereby makes the faster processor complete its MPI tasks at a timeframe closer to that of the other processors. Essentially, in order to provide additional tasks to the faster processor, rather than dividing the work A by the number of processors N such that each processor is allocated 1/Nth of the work, the work is divided by N+delta, where delta is some additional amount determined by the load leveler 690, for example based on a determined difference in completion times of the MPI tasks of the fastest and slowest processors. Thus, if the difference in completion times is large, the delta value may be large and if the difference is small, the delta value may be small. Various relationships between the delta value and the difference in completion times may be utilized. These relationships may be reflected in a function executed by the load leveler 690, a lookup table data structure, or the like.

Having divided the work into N+delta portions, more portions of the work may be assigned to the fastest processor to process concurrently as separate MPI tasks. Thus, the fastest processor may spawn additional threads for executing a plurality of MPI tasks, which may all be the same MPI program executing on different portions of data, for example, or different MPI tasks executing on the same or different portions of data, concurrently. In a non-data dependent implementation of this illustrative embodiment, each MPI task may operate on a 1/(N+delta) portion of data. However, in a data dependent implementation, the amount of data processed by each MPI task may be different but additional MPI tasks may be processed by the same processor concurrently.

Thus, if X number of MPI tasks are running concurrently on the fastest processor, in the timeframe of a single MPI task, the fastest processor would process X/N+delta work (not necessarily data, but an amount of work) while the slowest processor would process 1/N+delta work. The amount of work being processed by the slowest processor is thus reduced, and hence the slowest processor should complete faster, while the amount of work being processed by the faster processor is increased and thus, the fastest processor should complete slower. In this way, the completion times of the faster and slower processors are brought closer together and wasted cycles waiting on other processors to complete are thereby reduced.

To illustrate this option with an example, it is best to first assume a non-data dependent implementation. Thus, as one example, assume there are four available processors for performing a MPI job on a matrix of data values. Rather than dividing the matrix into four portions and giving one portion to each of the processors, as would typically be done, the mechanisms of the illustrative embodiment, e.g., the load leveler 690, may divide the matrix into five portions and assign two tasks to the fastest processor and one portion to each of the slower processors. The fastest processor runs its two tasks concurrently such that they both complete at approximately the same time. As a result, the slower processors have ⅕ instead of ¼ of the matrix, i.e. the work, to process and the faster processor has ⅔ instead of ¼ of the matrix to process, thereby evening out the workload across the plurality of processors.

It should be appreciated that there are other instances where load balancing of data dependent MPI jobs may be advantageous other than when wait periods exceed a predetermined threshold. In these other instances, resources of the processors which were previously allocated to other jobs may be freed such that they may be used with the current MPI job. Thus, the load leveler 690 may monitor the available resources of the processors in the system to determine if additional resources have been freed and may be used with the current MPI job. For example, a resource pool on each of the processors may be monitored by the load leveler 690 to determine if additional resources are freed, a number of jobs running on each of the processors may be monitored, or the like, to determine when load balancing should be performed to make use of freed resources.

For example, the processors in the system performing the MPI job may be shared by multiple users executing different jobs. If a first user's job completes far ahead of a second user's job, then the resources consumed by the first user's job will be freed and returned to the resource pool. In this case, the second user's job may be able to potentially create more MPI tasks and run them on the resources freed up by the completion of the first user's job. Thus, in response to detecting the freeing of resources on one or more of the processors, the load leveler 690 may initiate the MPI job splitting operation described above to generate additional MPI tasks to take advantage of the additional freed resources.

As another example, individual processors in the system performing the MPI job may execute jobs of different priorities. Thus, a processor may execute a job having a high priority and a job having a lower priority at the same time. In such a case, the job with the higher priority may temporarily "steal" resources from the job with the lower priority based on the priority policy utilized by the processor. Thus, additional resources may be freed for use by the higher priority job. The load leveler 690 may thus, again initiate the operation described above in order to generate additional MPI tasks to take advantage of these "stolen" resources.

Thus, the illustrative embodiments provide mechanisms for balancing the load of MPI tasks across a plurality of processors in a multiple processor system executing an MPI job. In so doing, the size of the wait periods of faster processors is minimized and thus, the available computation time is increased. This provides a great advantage over known MPI based systems which do not provide any load leveling or balancing functionality and instead rely solely on the partitioning of data into equal sized sets to attempt to distribute the workload across processors. As noted above, the known approach results in large wait periods for faster processors as they wait for slower processors to complete their computation phases.

Figure 7:
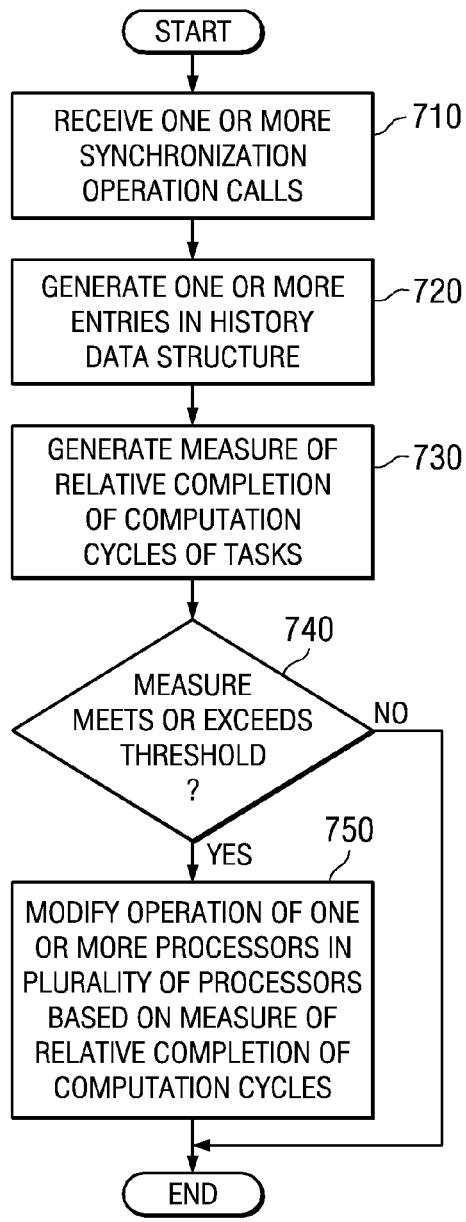
FIG. 7 is a flowchart outlining an exemplary operation for modifying an operation of processors executing an MPI job in accordance with one illustrative embodiment.
Figure 9:
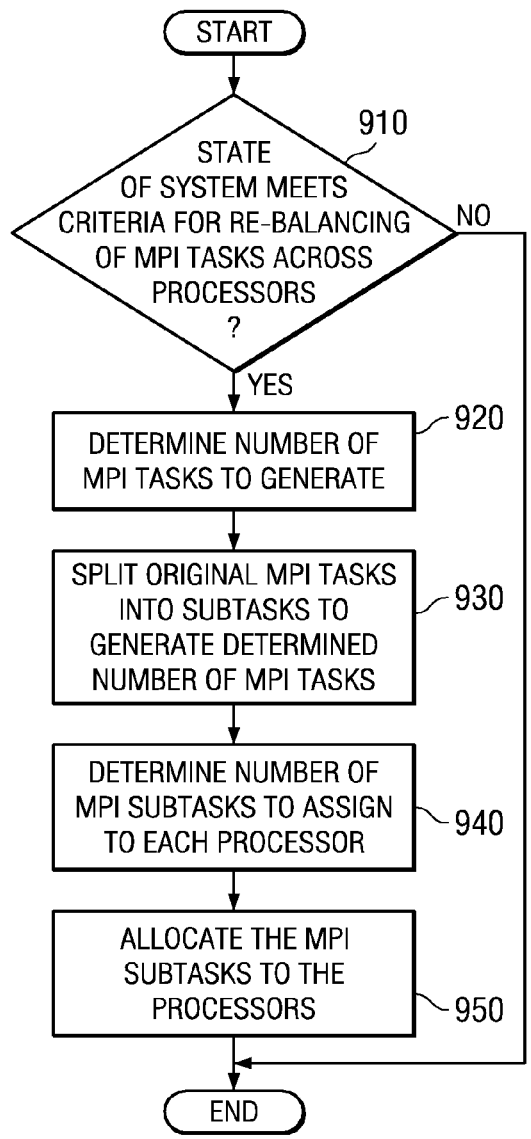
FIG. 9 is a flowchart outlining an exemplary operation for performing load balancing of MPI tasks across a plurality of processors using a history data structure for MPI tasks that are data dependent.
Figure 8:
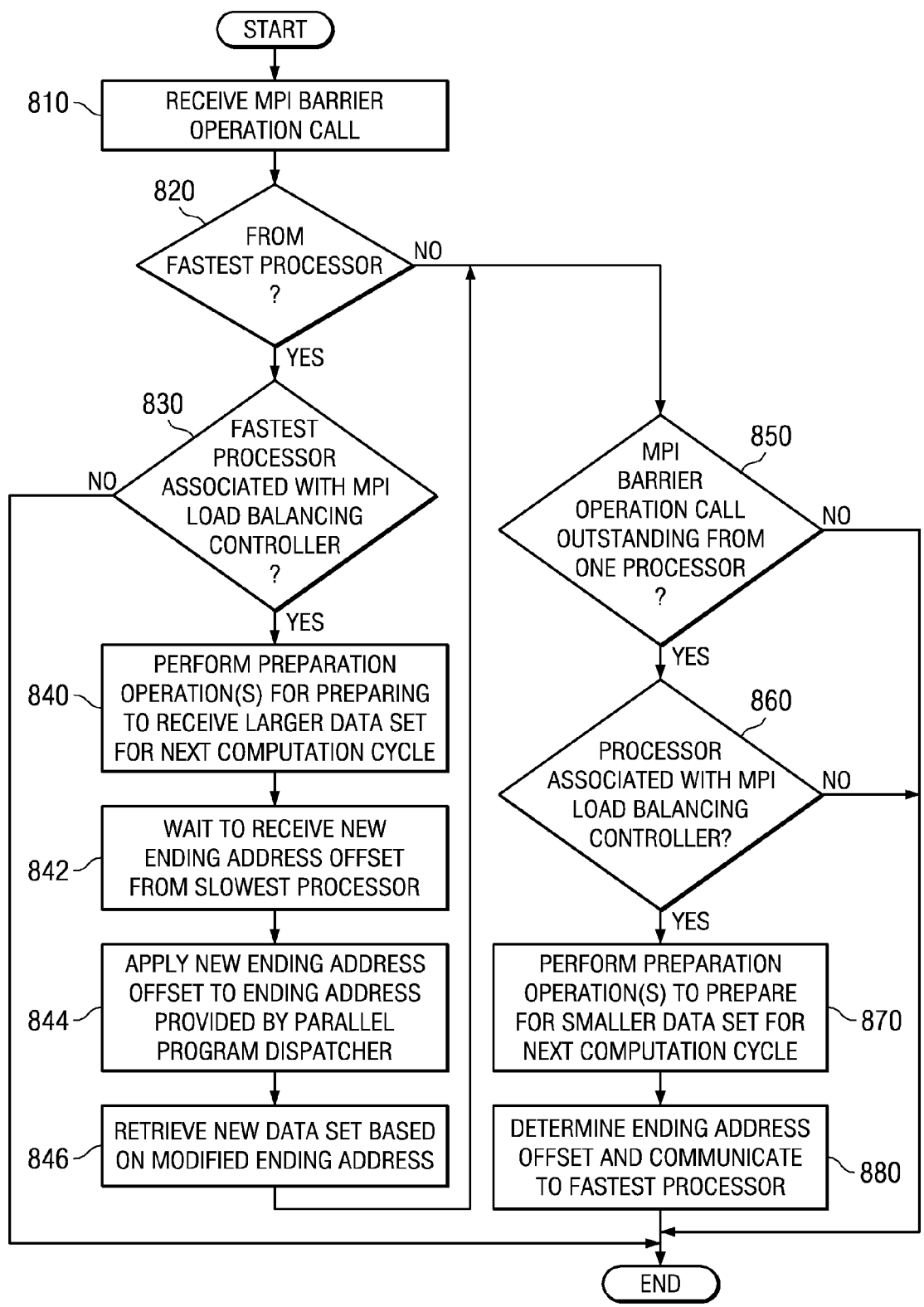
FIG. 8 is a flowchart outlining an exemplary operation for performing load balancing of MPI tasks across a plurality of processors using a history data structure for MPI tasks that are not data dependent.

FIGS. 7-9 are exemplary flowcharts outlining exemplary operations for performing load balancing of MPI tasks. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 7 is a flowchart outlining an exemplary operation for modifying an operation of processors executing an MPI job in accordance with one illustrative embodiment. This operation outlined in FIG. 7 may be performed, for example, by an MPI load balancing controller associated with one or more processors of a multiple processor system that is executing the MPI job.

As shown in FIG. 7, the operation may start with receiving one or more synchronization operation calls from one or more processors of the multiple processor system (step 710). These synchronization calls may include an identifier of a task performing the synchronization operation call and a timestamp of the synchronization operation call, for example. Based on the one or more synchronization operation calls, one or more entries in a history data structure identifying the one or more synchronization operation calls and their associated task identifier and timestamp are generated (step 720).

A measure of the relative completion of computation phases of tasks of the job on the plurality of processors in the multiprocessor system is determined based on the history data structure entries (step 730). For example, this measure of relative completion of computation phases may comprise determining a difference in timestamps to two or more entries of the history data structure. A determination is made as to whether the measure of the relative completion of computation phases meets or exceeds a threshold value (step 740). If not, the operation terminates. If the measure of relative completion of computation phases does meet or exceed the threshold value, an operation of the plurality of processors for executing the job is modified (step 750). The operation then terminates.

Preferably, the operation is modified to reduce wasted processor cycles of one or more of the processors in the plurality of processors. In one illustrative embodiment, the modification of the operation comprises modifying workloads of the processors in the plurality of processors in order to bring time periods for completion of MPI tasks executing on the processors within a tolerance of each other. In another illustrative embodiment, the modification of the operation comprises selecting another program to execute on at least one of the processors in the plurality of processor while that processor is idle with regard to the MPI job.

In yet another illustrative embodiment, the modification of the operation may comprise executing one or more housekeeping operations, e.g., a memory management or garbage collection operation, in at least one of the processors in the plurality of processors while that processor is idle with regard to the MPI job. In still another illustrative embodiment, the modification of the operation may comprise placing at least one of the processors in the plurality of processors into a low power consumption state while that processor is idle with regard to the MPI job. Moreover, modifying an operation of the plurality of processors may comprise performing a load balancing function for shifting workload amongst at least two processors in the plurality of processors.

FIG. 8 is a flowchart outlining an exemplary operation for performing load balancing of MPI tasks across a plurality of processors using a history data structure for MPI tasks that are not data dependent. The operation outlined in FIG. 8 may be performed, for example, by a MPI load balancing controller associated with one or more processors of a multiple processor system that is executing an MPI job.

As shown in FIG. 8, the operation starts with the MPI load balancing controller receiving a MPI barrier operation call from a processor (step 810). The MPI load balancing controller determines if this MPI barrier operation call is associated with a fastest processor of the plurality of processors executing the MPI job (step 820). If this MPI barrier operation call is associated with a fastest processor, the MPI load balancing controller determines if the fastest processor is associated with the MPI load balancing controller (step 830). If not, the operation terminates. If so, the MPI load balancing controller performs one or more operations to prepare for a larger data set to be distributed to the fastest processor in the next computation cycle (step 840). As discussed above, these operations may include, for example, allocating additional cache resources, buffers, and/or the like, for handling an increased size data set.

The MPI load balancing controller then waits to receive a new ending address offset from the MPI load balancing controller of a slowest processor (step 842) which is then applied to the ending address provided by the parallel program dispatcher to adjust the size of the data set for the next computation cycle (step 844). The fastest processor then retrieves the data corresponding to the modified data set based on the modified ending address (step 846).

Thereafter, or if the MPI barrier operation call is not associated with a fastest processor (step 820), the MPI load balancing controller determines if there is only one processor that has not performed an MPI barrier operation call (step 850). If there is only one processor, i.e. a slowest processor, that has not performed an MPI barrier operation call, the MPI load balancing controller determines if the processor that has not performed an MPI barrier operation call is associated with the MPI load balancing controller (step 860). If so, the MPI load balancing controller performs one or more operations to prepare to receive a smaller sized data set to be processed in the next computation cycle (step 870). As discussed above, this may involve reducing an allocated amount of cache, number of buffers, etc., as well as computing an amount of the reduction in the size of the data set. The MPI load balancing controller then determines an ending address offset which it communicates to a fastest processor (step 880). Thereafter, if there is more than one processor that has not performed an MPI barrier operation call (step 850) or if the processor that has not performed the MPI barrier operation call is not associated with the MPI load balancing controller (860), the operation terminates. It should be appreciated that this operation may be repeated for each MPI barrier operation call that is received by the MPI load balancing controller.

FIG. 9 is a flowchart outlining an exemplary operation for performing load balancing of MPI tasks across a plurality of processors using a history data structure for MPI tasks that are data dependent. The operation outlined in FIG. 9 may be performed, for example, by a MPI load level of a parallel program dispatcher, for example, that dispatches MPI tasks to processors of a multiple processor system that is executing an MPI job. As shown in FIG. 9, the operation starts with the load balancer determining that a state of the multiple processor system meets criteria for initiating re-balancing of MPI tasks across the multiple processors (step 910). As discussed above, the state of the multiple processor system meeting criteria for initiating re-balancing may be, for example, a difference between a fastest processor calling an MPI barrier operation call and a slowest processor calling the MPI barrier operation call being greater than a threshold. Such information may be maintained in a history data structure as discussed above and thus, may be retrieved when determining whether to perform re-balancing of MPI tasks in data-dependent implementations. Another example of the state meeting criteria for initiating re-balancing of MPI tasks is the freeing of resources in one or more of the processors or the obtaining, e.g., stealing, of resources from lower priority tasks, as discussed above.

If the current state of the multiple processor system does not meet the criteria for load re-balancing, then the operation terminates. If the current state of the multiple processor system does meet the criteria for load re-balancing, then a number of MPI tasks to be generated is determined (step 920). As discussed above, this determination may involve, for example, determining a difference between a fastest processor's and a slowest processor's timestamps of their respective barrier operation calls from a previous MPI job cycle and determining a "delta" value for the number of MPI tasks to be generated. Again, such information may be maintained in a history data structure as discussed above and thus, may be retrieved when determining the delta value for re-balancing MPI tasks in data-dependent implementations. The delta value may be determined based on a pre-established function, a lookup table data structure, or the like. The number of MPI tasks may then be generated based on the number of processors and this determined delta value, as previously described above.

The load leveler may then generate the additional tasks by splitting the original MPI tasks for the processors into subtasks based on the determined number of MPI tasks to be generated (step 930). As a result, the original N MPI tasks for N processors may be split into N+delta subtasks which may then be apportioned out to the processors. The load leveler may then determine how many of the MPI subtasks to assign to each of the processors with the fastest processor(s) receiving a larger number of the MPI subtasks and the slower processor(s) receiving a smaller number of the MPI subtasks (step 940). The load leveler may then allocate the MPI subtasks to the processors in accordance with the determination in step 940 (step 950) with the operation terminating thereafter. Although FIG. 9 shows the operation terminating, it should be appreciated that this operation may be repeated in a periodic or continuous manner or in response to an event occurring, such as a user input or the like.

Thus, in one example, the fastest processor may receive two MPI subtasks, which are now simply MPI tasks, to perform concurrently while the rest of the processors may receive one MPI subtask. The MPI subtasks provided to the slower processors will be smaller than the original MPI tasks and thus, these processors should complete the MPI subtasks more quickly while the fastest processor will complete its concurrent MPI subtasks more slowly thereby converging the completion times of all the processors. It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multiple processor system, for balancing a Message Passing Interface (MPI) workload across a plurality of processors, comprising:
    receiving one or more MPI synchronization operation calls from one or more processors of the plurality of processors;
    identifying a first processor, in the plurality of processors, having a fastest time of completion of a computation phase of an associated MPI task, during a computation cycle, based on the received one or more MPI synchronization operation calls, wherein the computation phase of the first associated MPI task involves executing the MPI task on a first data set;
    performing a first setup operation in the first processor for preparing to receive a second data set that is larger than the first data set in response to identifying the first processor as having a fastest time of completion of the computation phase, wherein the first setup operation modifies an allocation of resources in the multiple processor system for use by the first processor in receiving the second data set;
    identifying a second processor, in the plurality of processors, having a slowest time of completion of a computation phase of a second associated MPI task, during the computation cycle, based on the received one or more MPI synchronization operation calls, wherein the computation phase of the second associated MPI task involves executing the MPI task on a third data set; and
    performing a second setup operation in the second processor for preparing to receive a fourth data set that is smaller than the third data set in response to identifying the second processor as having a slowest time of completion of the computation phase, wherein the second setup operation modifies an allocation of resources in the multiple processor system for use by the second processor in receiving the fourth data set.

2. The method of claim 1, wherein the first setup operation is performed while at least one other processor in the plurality of processors is still in a computation phase of its associated MPI task during the same computation cycle.

3. The method of claim 1, wherein the first setup operation comprises at least one of allocating a larger portion of cache memory for use by the first processor or acquiring a host fabric interface window or windows for communication by the first processor.

4. The method of claim 1, wherein the second setup operation comprises at least one of allocating a smaller portion of cache memory for use by the second processor or acquiring a host fabric interface window or windows for communication by the second processor.

5. The method of claim 1, further comprising:
    determining if a difference in the fastest time of completion and the slowest time of completion exceeds a threshold, wherein the first setup operation and the second setup operation are performed in response to the difference exceeding the threshold.

6. The method of claim 1, wherein each processor of the plurality of processors comprises a MPI load balancing controller, wherein each MPI load balancing controller implements the receiving and identifying operations, an MPI load balancing controller associated with the first processor implements performing the first setup operation, and an MPI load balancing controller associated with the second processor implements performing the second setup operation.

7. The method of claim 1, wherein the MPI job is a set of tasks to be performed in parallel on the plurality of processors, and wherein each processor of the plurality of processors executes a corresponding task of the MPI job in parallel on a corresponding set of data allocated to the processor from a superset of data.

8. A computer program product comprising a non-transitory computer useable medium having a computer readable program, wherein the computer readable program, when executed on a data processing system, causes the data processing system to:

receive one or more Message Passing Interface (MPI) synchronization operation calls from one or more processors of a plurality of processors;

identify a first processor, in the plurality of processors, having a fastest time of completion of a computation phase of an associated MPI task, during a computation cycle, based on the received one or more MPI synchronization operation calls, wherein the computation phase of the first associated MPI task involves executing the MPI task on a first data set;

perform a first setup operation in the first processor for preparing to receive a second data set that is larger than the first data set in response to identifying the first processor as having a fastest time of completion of the computation phase, wherein the first setup operation modifies an allocation of resources in the multiple processor system for use by the first processor in receiving the second data set;

identify a second processor, in the plurality of processors, having a slowest time of completion of a computation phase of a second associated MPI task, during the computation cycle, based on the received one or more MPI synchronization operation calls, wherein the computation phase of the second associated MPI task involves executing the MPI task on a third data set; and perform a second setup operation in the second processor for preparing to receive a fourth data set that is smaller than the third data set in response to identifying the second processor as having a slowest time of completion of the computation phase, wherein the second setup operation modifies an allocation of resources in the multiple processor system for use by the second processor in receiving the fourth data set.

9. The computer program product of claim 8, wherein the first setup operation is performed while at least one other processor in the plurality of processors is still in a computation phase of its associated MPI task during the same computation cycle.

10. The computer program product of claim 8, wherein the first setup operation comprises at least one of allocating a larger portion of cache memory for use by the first processor or acquiring a host fabric interface window or windows for communication by the first processor.

11. The computer program product of claim 8, wherein the second setup operation comprises at least one of allocating a smaller portion of cache memory for use by the second processor or acquiring a host fabric interface window or windows for communication by the second processor.

12. The computer program product of claim 8, wherein the computer readable program further causes the data processing system to:

determine if a difference in the fastest time of completion and the slowest time of completion exceeds a threshold, wherein the first setup operation and the second setup operation are performed in response to the difference exceeding the threshold.

13. The computer program product of claim 8, wherein each processor of the plurality of processors comprises a MPI load balancing controller, wherein each MPI load balancing controller performs the operations to receive one or more MPI synchronization operation calls and identify the first processor and second processor, an MPI load balancing controller associated with the first processor performs the first setup operation, and an MPI load balancing controller associated with the second processor performs the second setup operation.

14. The computer program product of claim 8, wherein the MPI job is a set of tasks to be performed in parallel on the plurality of processors, and wherein each processor of the plurality of processors executes a corresponding task of the MPI job in parallel on a corresponding set of data allocated to the processor from a superset of data.

15. A data processing system, comprising:

a plurality of processors; and at least one load balancing controller associated with the plurality of processors, wherein the at least one load balancing controller:

receives one or more MPI synchronization operation calls from one or more processors of the plurality of processors;

identifies a first processor, in the plurality of processors, having a fastest time of completion of a computation phase of an associated MPI task, during a computation cycle, based on the received one or more MPI synchronization operation calls, wherein the computation phase of the first associated MPI task involves executing the MPI task on a first data set;

performs a first setup operation in the first processor for preparing to receive a second data set that is larger than the first data set in response to identifying the first processor as having a fastest time of completion of the computation phase, wherein the first setup operation modifies an allocation of resources in the multiple processor system for use by the first processor in receiving the second data set;

identifying a second processor, in the plurality of processors, having a slowest time of completion of a computation phase of a second associated MPI task, during the computation cycle, based on the received one or more MPI synchronization operation calls, wherein the computation phase of the second associated MPI task involves executing the MPI task on a third data set; and performing a second setup operation in the second processor for preparing to receive a fourth data set that is smaller than the third data set in response to identifying the second processor as having a slowest time of completion of the computation phase, wherein the second setup operation modifies an allocation of resources in the multiple processor system for use by the second processor in receiving the fourth data set.

16. The system of claim 15, wherein the first setup operation is performed while at least one other processor in the plurality of processors is still in a computation phase of its associated MPI task during the same computation cycle.

17. The system of claim 15, wherein the first setup operation comprises at least one of allocating a larger portion of cache memory for use by the first processor or acquiring a host fabric interface window or windows for communication by the first processor.

* * * * *